(12) United States Patent
Shiozawa et al.

(10) Patent No.: US 8,682,599 B2
(45) Date of Patent: *Mar. 25, 2014

(54) ROAD SURFACE FRICTION COEFFICIENT ESTIMATING DEVICE AND ROAD SURFACE FRICTION COEFFICIENT ESTIMATING METHOD

(75) Inventors: Yuuki Shiozawa, Isehara (JP); Masaaki Nawano, Yokosuka (JP); Hiroshi Mouri, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 365 days.

This patent is subject to a terminal disclaimer.

(21) Appl. No.: 13/001,971

(22) PCT Filed: Jun. 26, 2009

(86) PCT No.: PCT/JP2009/061684
§ 371 (c)(1),
(2), (4) Date: Dec. 29, 2010

(87) PCT Pub. No.: WO2010/001820
PCT Pub. Date: Jan. 7, 2010

(65) Prior Publication Data
US 2011/0106458 A1    May 5, 2011

(30) Foreign Application Priority Data

Jun. 30, 2008 (JP) .................................. 2008-171511

(51) Int. Cl.
*G01L 1/00* (2006.01)
(52) U.S. Cl.
USPC .............................. 702/41; 303/149; 303/155

(58) Field of Classification Search
USPC .................................. 73/146, 104; 702/104
See application file for complete search history.

(56) References Cited

U.S. PATENT DOCUMENTS

| 4,947,332 | A |   | 8/1990  | Ghoneim |
|-----------|---|---|---------|---------|
| 5,123,715 | A | * | 6/1992  | Okubo ........................ 303/150 |
| 5,132,906 | A |   | 7/1992  | Sol et al. |
| 5,355,717 | A | * | 10/1994 | Tanaka et al. .................. 73/105 |

(Continued)

FOREIGN PATENT DOCUMENTS

| JP | 6-001228  A | 1/1994 |
| JP | 06-078736 A | 3/1994 |

(Continued)

OTHER PUBLICATIONS

U.S. Appl. No. 13/001,988, filed Dec. 29, 2010, Shiozawa et al.

(Continued)

*Primary Examiner* — Sujoy Kundu
*Assistant Examiner* — Alvaro Fortich
(74) *Attorney, Agent, or Firm* — Foley & Lardner LLP

(57) ABSTRACT

A road surface friction coefficient estimating device includes a lateral force detecting section for detecting the lateral force of a wheel during traveling, a slip angle detecting section for detecting the slip angle of the wheel during traveling, and a road surface μ calculating section for estimating the relationship between the detected lateral force and the detected slip angle on the basis of the ratio between the detected lateral force and the detected slip angle, the correlation between the lateral force and the slip angle in the case of the reference road surface, and at least either the detected lateral force or the detected slip angle.

16 Claims, 19 Drawing Sheets

(56) References Cited

U.S. PATENT DOCUMENTS

| | | | |
|---|---|---|---|
| 5,385,393 A | 1/1995 | Tanaka et al. | |
| 5,948,961 A * | 9/1999 | Asano et al. | 73/9 |
| 6,015,192 A * | 1/2000 | Fukumura | 303/140 |
| 6,615,124 B1 * | 9/2003 | Adachi | 701/70 |
| 6,895,317 B2 | 5/2005 | Yasui et al. | |
| 6,922,624 B2 * | 7/2005 | Isaji et al. | 701/70 |
| 6,941,213 B2 | 9/2005 | Yasui et al. | |
| 8,078,351 B2 * | 12/2011 | Nardi et al. | 701/29.1 |
| 2001/0029419 A1 * | 10/2001 | Matsumoto et al. | 701/80 |
| 2002/0166373 A1 | 11/2002 | Mancosu et al. | |
| 2003/0130775 A1 * | 7/2003 | Lu et al. | 701/36 |
| 2003/0195689 A1 * | 10/2003 | Mori | 701/70 |
| 2004/0019417 A1 | 1/2004 | Yasui et al. | |
| 2004/0133324 A1 | 7/2004 | Yasui et al. | |
| 2004/0138831 A1 * | 7/2004 | Watanabe et al. | 702/33 |
| 2004/0163454 A1 | 8/2004 | Tsuchie et al. | |
| 2004/0204812 A1 | 10/2004 | Tran | |
| 2005/0010350 A1 * | 1/2005 | Hiwatashi | 701/80 |
| 2005/0049774 A1 | 3/2005 | Kogure | |
| 2006/0041365 A1 * | 2/2006 | Mori | 701/70 |
| 2006/0201240 A1 * | 9/2006 | Morinaga | 73/146 |
| 2008/0110249 A1 | 5/2008 | DeGeorge et al. | |
| 2008/0183419 A1 * | 7/2008 | Cong et al. | 702/155 |
| 2008/0228329 A1 | 9/2008 | Hartman | |
| 2008/0262692 A1 * | 10/2008 | Kogure et al. | 701/90 |
| 2009/0105921 A1 * | 4/2009 | Hanatsuka et al. | 701/80 |
| 2010/0114449 A1 * | 5/2010 | Shiozawa et al. | 701/90 |
| 2010/0131229 A1 | 5/2010 | Nardi et al. | |
| 2010/0211255 A1 * | 8/2010 | Takenaka et al. | 701/29 |
| 2010/0211256 A1 * | 8/2010 | Takenaka et al. | 701/29 |
| 2011/0106458 A1 * | 5/2011 | Shiozawa et al. | 702/41 |
| 2011/0118935 A1 * | 5/2011 | Shiozawa et al. | 701/35 |
| 2011/0130974 A1 * | 6/2011 | Yngve et al. | 702/41 |

FOREIGN PATENT DOCUMENTS

| | | |
|---|---|---|
| JP | 2003-312465 A | 11/2003 |
| JP | 2004-130965 A | 4/2004 |
| JP | 2006-273108 A | 10/2006 |
| JP | 2007-106273 A | 4/2007 |
| JP | 2008-087724 A | 4/2008 |
| WO | WO 2008/133150 A1 | 11/2008 |

OTHER PUBLICATIONS

Y. Shiozawa et al., Non-final Office Action U.S. Appl. No. 13/001,988, DTD Mar. 22, 2013, 12 pages.

Y. Shiozawa et al., Notice of Allowance U.S. Appl. No. 13/001,988, dated Sep. 12, 2013, (11 pages).

* cited by examiner

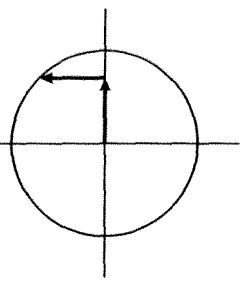
FIG.2B
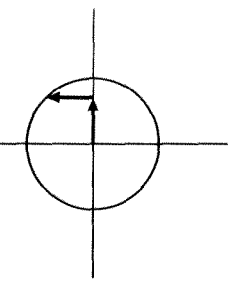
FIG.2C
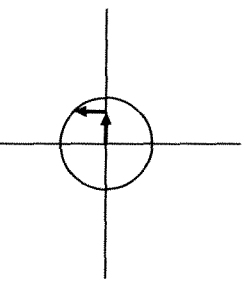
FIG.2D
FIG.2A
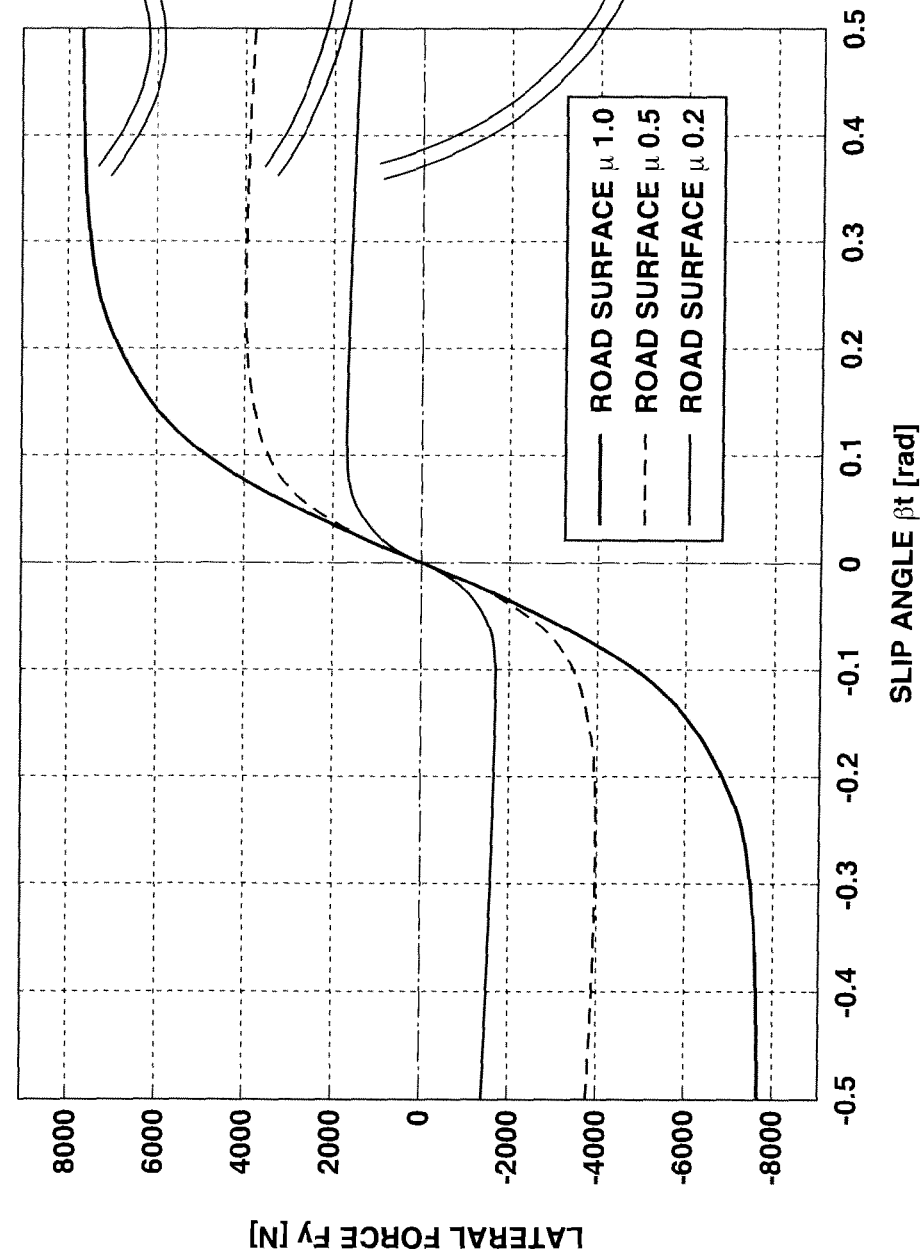

- Gx: LONGITUDINAL ACCELERATION
- Gy: LATERAL ACCELERATION
- Ay: ACCELERATION IN RADIAL DIRECTION OF TURNING

- Gx: LONGITUDINAL ACCELERATION
- Gy: LATERAL ACCELERATION
- Ay: ACCELERATION IN RADIAL DIRECTION OF TURNING
- $\dot{V}x$: AMOUNT OF CHANGE IN LONGITUDINAL SPEED
- $\dot{V}y$: AMOUNT OF CHANGE IN LATERAL SPEED

ROAD SURFACE FRICTION COEFFICIENT ESTIMATING DEVICE AND ROAD SURFACE FRICTION COEFFICIENT ESTIMATING METHOD

TECHNICAL FIELD

The present invention relates to a road surface friction coefficient estimating device and a road surface friction coefficient estimating method for estimating a road surface friction coefficient (henceforth referred to also as road surface μ) of a road surface on which an automotive vehicle is traveling.

BACKGROUND OF THE INVENTION

There is a vehicle running control device that measures rotational speed of a driving wheel, estimates a road surface μ on a basis of a maximum of its rotational acceleration, and performs torque control to prevent the driving wheel from slipping (see patent document 1, for example).
Patent document 1: JP 6-78736 A

SUMMARY OF THE INVENTION

Since the device according to patent document 1 estimates the road surface μ on the basis of the rotational speed of the driving wheel, it is impossible to estimate the road surface μ unless the rotational speed actually changes due to slippage of the driving wheel.

It is a problem of the present invention to estimate a road surface μ of a traveled road surface before rotational speed of a wheel actually changes due to slippage of the wheel.

In order to solve the problem, a road surface friction coefficient estimating device according to the present invention comprises: a lateral force detecting section that detects a lateral force of a wheel; a slip angle detecting section that detects a slip angle of the wheel; and a road surface friction coefficient estimating section that: stores information about a characteristic curve in a coordinate plane, wherein the coordinate plane has a coordinate axis representing the lateral force and a coordinate axis representing the slip angle, and wherein the characteristic curve represents a relationship between the lateral force and the slip angle under condition of a reference road surface friction coefficient; finds as a reference point a point in the coordinate plane at which a straight line intersects with the characteristic curve, wherein the straight line passes through an origin point of the coordinate plane and a detected point, and wherein the detected point corresponds to a detected value of the lateral force obtained by the lateral force detecting section and a detected value of the slip angle obtained by the slip angle detecting section; and calculates an estimated value of road surface friction coefficient, on a basis of a reference value and the detected value of at least one of the lateral force and the slip angle, and the reference road surface friction coefficient, wherein the reference value corresponds to the reference point.

Moreover, a road surface friction coefficient estimating method according to the present invention comprises: an operation of detecting a lateral force of a wheel; an operation of detecting a slip angle of the wheel; and an operation of: storing information about a characteristic curve in a coordinate plane, wherein the coordinate plane has a coordinate axis representing the lateral force and a coordinate axis representing the slip angle, and wherein the characteristic curve represents a relationship between the lateral force and the slip angle under condition of a reference road surface friction coefficient; finding as a reference point a point in the coordinate plane at which a straight line intersects with the characteristic curve, wherein the straight line passes through an origin point of the coordinate plane and a detected point, and wherein the detected point corresponds to a detected value of the lateral force obtained by the lateral force detecting section and a detected value of the slip angle obtained by the slip angle detecting section; and calculating an estimated value of road surface friction coefficient, on a basis of a reference value and the detected value of at least one of the lateral force and the slip angle, and the reference road surface friction coefficient, wherein the reference value corresponds to the reference point.

BRIEF DESCRIPTION OF THE DRAWINGS

FIG. 2 is a characteristic diagram showing a tire characteristic curve and a tire friction circle under condition of each road surface μ, which is used to explain the technique on which the present invention is based.

MODE(S) FOR CARRYING OUT THE INVENTION

As described below, according to the present invention, it is possible to detect a lateral force of a wheel and a slip angle of the wheel, and estimate on a basis of them the road surface μ which changes every moment.

The following describes embodiments of the present invention with reference to the drawings.

Figure 1:
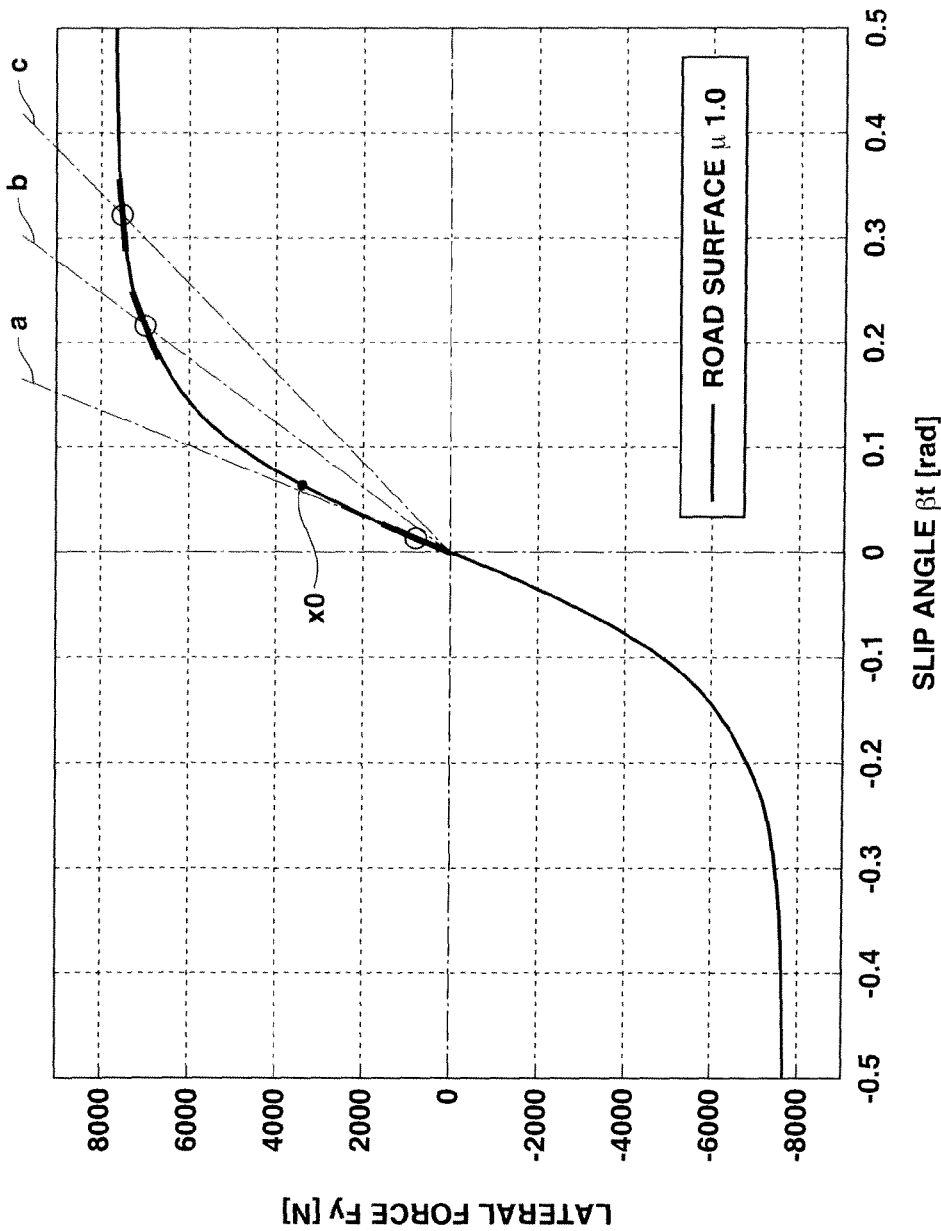
FIG. 1 is a characteristic diagram showing a tire characteristic curve, which is used to explain a technique on which the present invention is based.

<Technique on which the embodiments of the present invention are based> First, the following describes a technique on which the embodiments of the present invention are based. FIG. 1 shows a tire characteristic curve. This tire characteristic curve shows a general relationship which holds between slip angle βt of a wheel and lateral force Fy of the wheel. For example, a tire model is tuned on the basis of test data, to obtain a two-wheel-equivalent characteristic diagram (tire characteristic curve) for each of front wheels and rear wheels. For example, the tire model is created on the basis of a magic formula tire model. Lateral force Fy is a quantity typified by cornering force or side force.

As shown in FIG. 1, along the tire characteristic curve, the relationship between slip angle βt and lateral force Fy shifts from linear to nonlinear as the absolute value of slip angle βt increases. Namely, when slip angle βt is in a specific range from zero, a linear relationship holds between slip angle βt and lateral force Fy. Then, when the absolute value of slip angle βt has increased to some extent, the relationship between slip angle βt and lateral force Fy becomes nonlinear.

The transition from the linear relationship to the nonlinear relationship can be easily understood by focusing attention on the gradient of tangent to a tire characteristic curve. The gradient of tangent to the tire characteristic curve is represented by a ratio between an amount of change in slip angle βt and an amount of change in lateral force Fy, namely, a partial differential coefficient of lateral force Fy with respect to slip angle βt. The thus-represented gradient of tangent to the tire characteristic curve can be regarded as the gradient of tangent to the tire characteristic curve at a point (indicated by a circle in FIG. 1) at which an arbitrary straight line a, b or c intersects with the tire characteristic curve. If a point can be identified in the tire characteristic curve, i.e. slip angle βt and lateral force Fy can be identified, then tire frictional state can be estimated. For example, as shown in FIG. 1, if it is at a point x0 in the tire characteristic curve which is in the nonlinear region but close to the linear region, it can be estimated that the tire frictional state is in stable condition. If the tire frictional state is in stable condition, it can be estimated that the tire is in such a level to exhibit its ability, or that the vehicle is in stable condition.

FIG. 2 shows a tire characteristic curve and a tire friction circle under condition of each road surface μ. FIG. 2A shows the tire characteristic curve under condition of each road surface μ. FIGS. 2B, 2C and 2D each show a friction circle under condition of each road surface μ. Road surface μ is equal to 0.2, 0.5 or 1.0, for example. As shown in FIG. 2A, the tire characteristic curve for each road surface μ shows characteristics similar to one another. Moreover, as shown in FIGS. 2B, 2C and 2D, the friction circle contracts as road surface μ decreases. Namely, the lateral force that the tire can bear decreases as road surface μ decreases.

Figure 3:
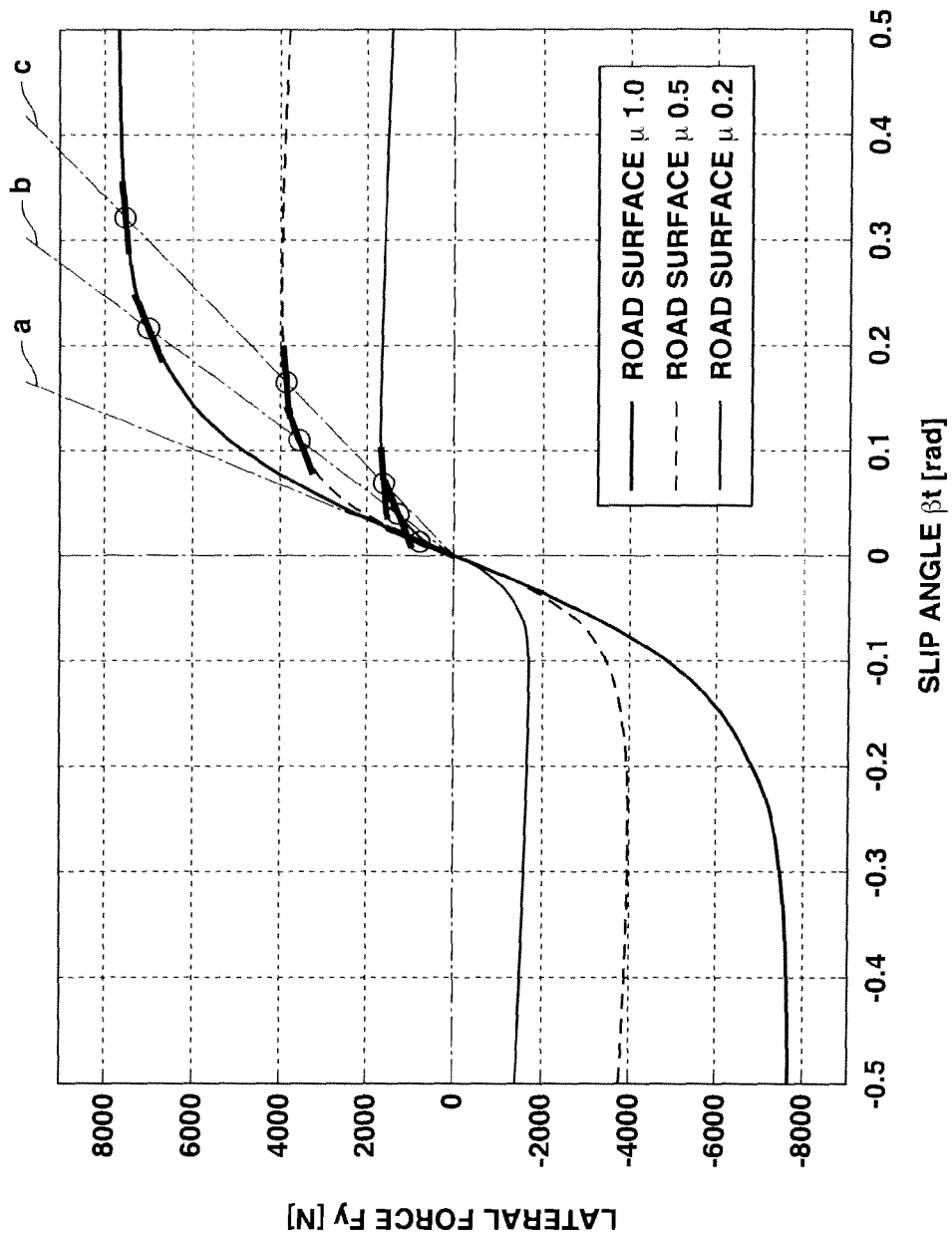
FIG. 3 is a characteristic diagram showing the gradient of tangent to a tire characteristic curve under condition of each road surface μ at points at which the tire characteristic curve intersects with straight lines passing through an origin point of the tire characteristic curve, which is used to explain the technique on which the present invention is based.

FIG. 3 shows a relationship between a tire characteristic curve under condition of each road surface μ and an arbitrary straight line a, b or c passing through an origin point. As shown in FIG. 3, for the tire characteristic curve under condition of each road surface μ, the gradient of tangent at a point at which the tire characteristic curve intersects with the arbitrary straight line a, b or c is obtained. Namely, for the tire characteristic curve under condition of each road surface μ, the gradient of tangent at a point at which the tire characteristic curve intersects with straight line a is obtained; for the tire characteristic curve under condition of each road surface μ, the gradient of tangent at a point at which the tire characteristic curve intersects with straight line b is obtained; and for the tire characteristic curve under condition of each road surface μ, the gradient of tangent at a point at which the tire characteristic curve intersects with straight line c is obtained. As a result, it can be obtained that the gradient of tangent to the tire characteristic curve under condition of each road surface μ at the intersection point with the same straight line is equal to one another.

Figure 4:
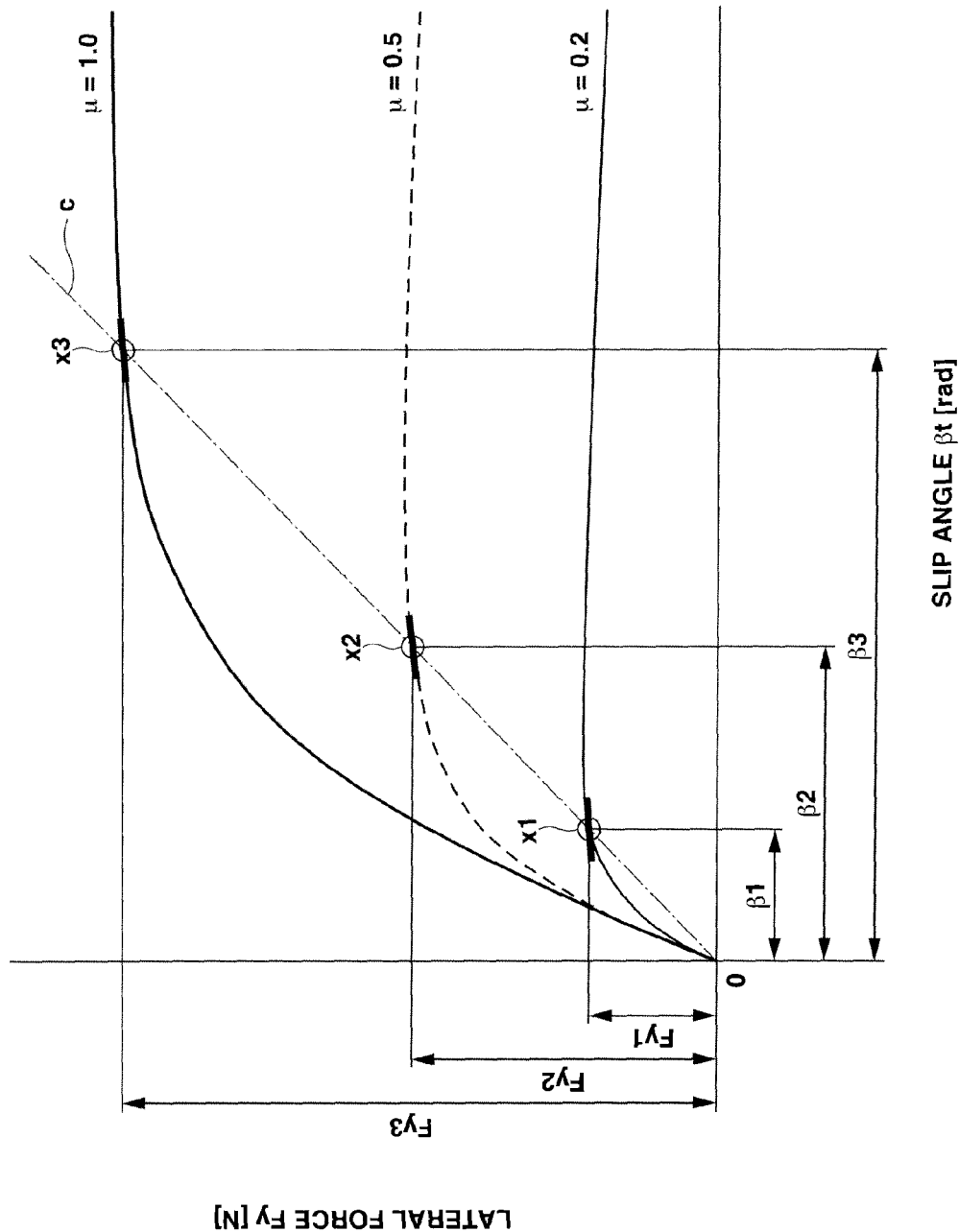
FIG. 4 is another characteristic diagram showing the gradient of tangent to a tire characteristic curve for each road surface μ at a point at which the tire characteristic curve intersects with a straight line passing through an origin point of the tire characteristic curve, which is used to explain the technique on which the present invention is based.

For example, FIG. 4 is focused on straight line c shown in FIG. 3. As shown in FIG. 4, the gradient of tangent to the tire characteristic curve under condition of each road surface μ at the intersection point with straight line c is equal to one another. Namely, the ratio (Fy1/βt1) between lateral force Fy1 and slip angle βt1 at an intersection point x1 obtained on the tire characteristic curve under condition of road surface μ=0.2, the ratio (Fy2/βt2) between lateral force Fy2 and slip angle βt2 at an intersection point x2 obtained on the tire characteristic curve under condition of road surface μ=0.5, the ratio (Fy3/βt3) between lateral force Fy3 and slip angle βt3 at an intersection point x3 obtained on the tire characteristic curve under condition of road surface μ=1.0, are equal to one another. The gradient of tangent at each intersection point x1, x2 or x3 obtained on the tire characteristic curve under condition of each road surface μ is equal to one another.

In this way, even with a difference in road surface μ, the gradient of tangent to each tire characteristic curve at a point is equal to one another, wherein the point is a point (βt, Fy) at which the ratio (Fy/βt) between lateral force Fy and slip angle βt is identical to one another. The ratio in lateral force Fy, and the ratio in slip angle βt between the points (βt, Fy) of the tire characteristic curves at which the ratio (Fy/βt) between lateral force Fy and slip angle βt is identical to one another, are equal to the ratio in road surface μ between the tire characteristic curves. Namely, if the ratio in lateral force Fy or the ratio in slip angle βt is determined, the ratio in road surface μ can be determined.

Figure 5:
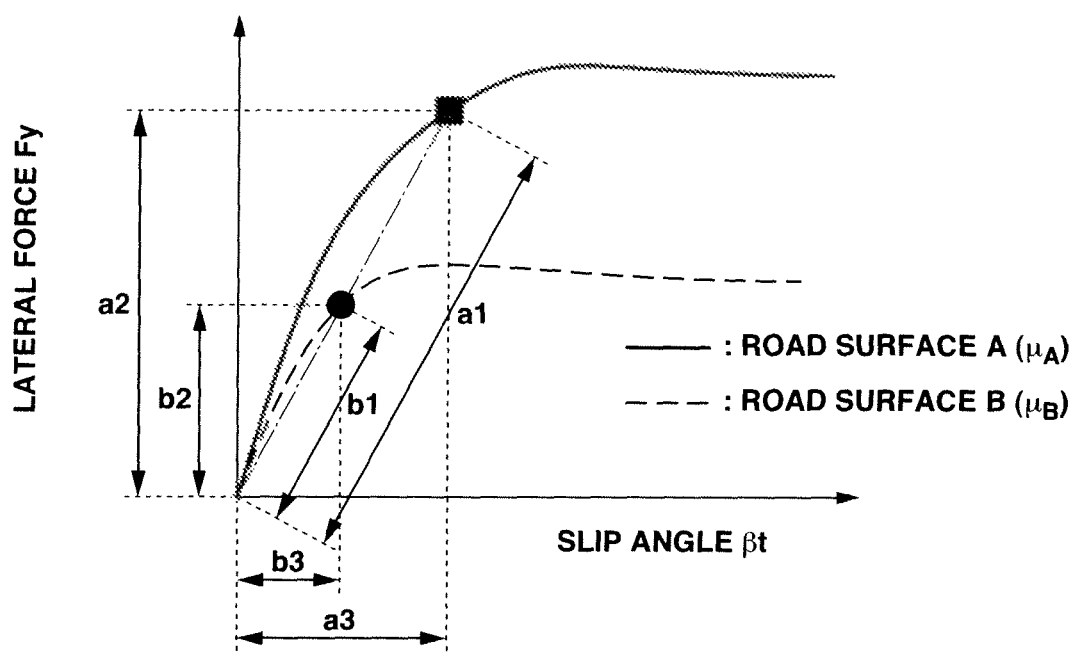
FIG. 5 is a characteristic diagram showing that a ratio in lateral force Fy, a ratio in slip angle βt, and a ratio in road surface μ, between tire characteristic curves different in road surface μ, are equal to one another, which is used to explain the technique on which the present invention is based.

FIG. 5 is used to explain that the ratio in lateral force Fy, the ratio in slip angle βt, and the ratio in road surface μ, between tire characteristic curves different in road surface μ, are equal to one another. FIG. 5 shows tire characteristic curves obtained under condition of a road surface A (road surface μ=μ$_A$) and a road surface B (road surface μ=μ$_B$) which are different in road surface μ. As shown in FIG. 5, the ratio (a2/b2) between a lateral force a2 and a lateral force b2 is equal to the ratio (μ$_A$/μ$_B$) between road surface μ$_A$ of road surface A and road surface μ$_B$ of road surface B, wherein the lateral force a2 corresponds to a point (βt, Fy) of the tire characteristic curve obtained under condition of road surface A (indicated by a solid box in FIG. 5), and the lateral force b2 corresponds to a point (βt, Fy) of the tire characteristic curve obtained under condition of road surface B (indicated by a solid circle in FIG. 5), and wherein the points are identical to one another in the ratio (Fy/βt) between lateral force Fy and slip angle βt. Similarly, the ratio (a3/b3) between a slip angle a3 and a slip angle b3 is equal to the ratio (μ$_A$/μ$_B$) between road surface μ$_A$ of road surface A and road surface μ$_B$ of road surface B, wherein the slip angle a3 corresponds to a point (βt, Fy) of the tire characteristic curve obtained under condition of road surface A, and the slip angle b3 corresponds to a point (βt, Fy) of the tire characteristic curve obtained under condition of road surface B, and wherein the points are identical to one another in the ratio (Fy/βt) between lateral force Fy and slip angle βt. Accordingly, the ratio (a1/b1) between a line segment length a1 and a line segment length b1 is equal to the ratio (μ$_A$/μ$_B$) between road surface μ$_A$ of road surface A and road surface μ$_B$ of road surface B, wherein the line segment length a1 is of a line segment connected between the origin point (0, 0) and a point (βt, Fy) of the tire characteristic curve obtained under condition of road surface A, and the line segment length b1 is of a line segment between the origin point (0, 0) and a point (βt, Fy) of the tire characteristic curve obtained under condition of road surface B, and wherein the points are identical to one another in the ratio (Fy/βt) between lateral force Fy and slip angle βt.

Figure 6:
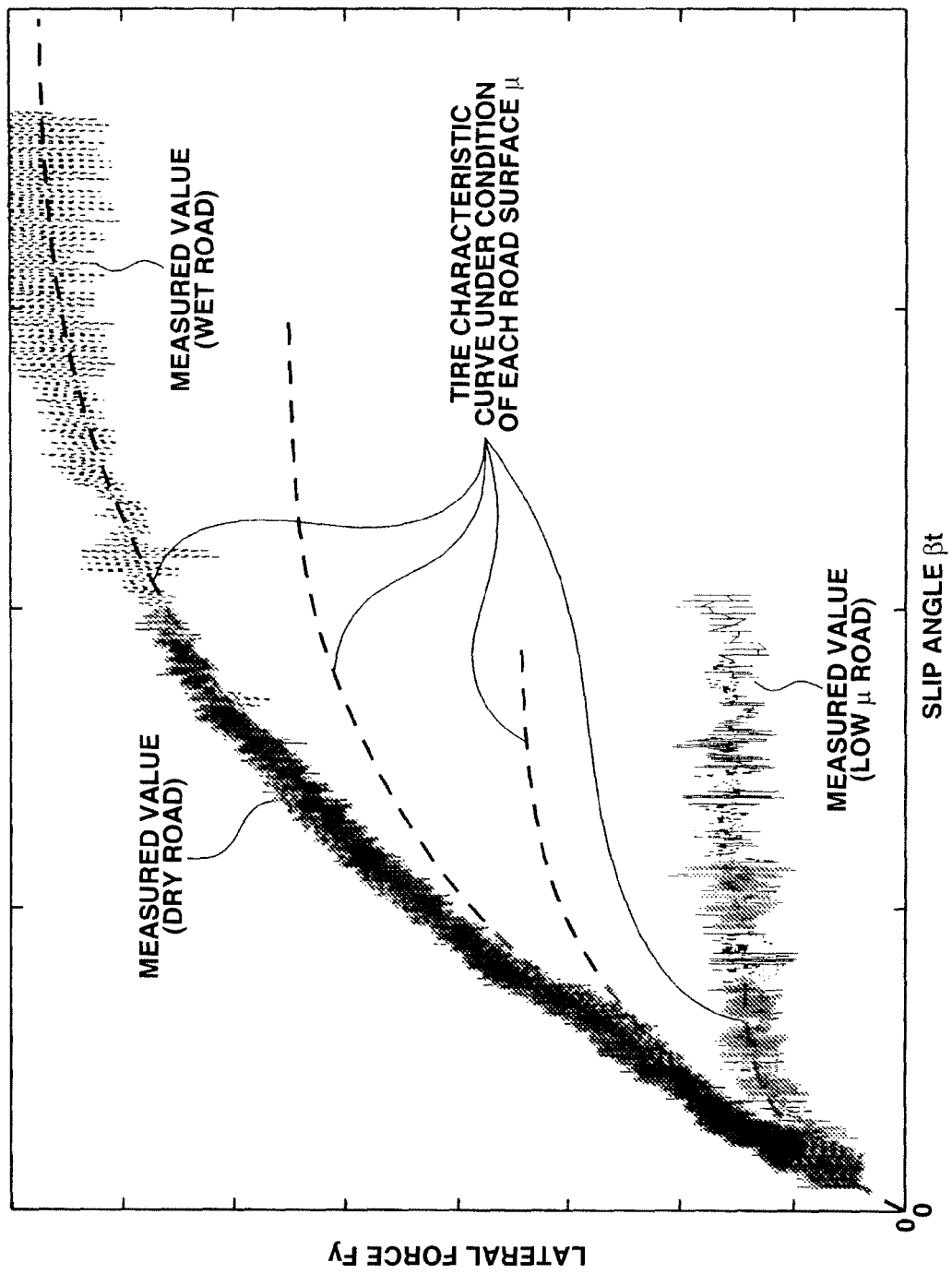
FIG. 6 is a characteristic diagram showing relationships between lateral force Fy and slip angle βt which are obtained under condition of road surfaces different in road surface μ, which is used to explain the technique on which the present invention is based.

FIG. 6 shows relationships between lateral force Fy and slip angle βt which are obtained under condition of road surfaces different in road surface μ. In FIG. 6, oscillating waves represent measured values under condition of a dry road, a wet road, and a low μ road, and dotted lines represent characteristic curves of a tire (normal tire) under condition of road surfaces. As shown in FIG. 6, among the tire characteristic curves under condition of road surfaces different in road surface μ, lateral force Fy and slip angle βt decrease as road surface μ decreases, while the ratio (Fy/βt) between lateral force Fy and slip angle βt is maintained.

Figure 7:
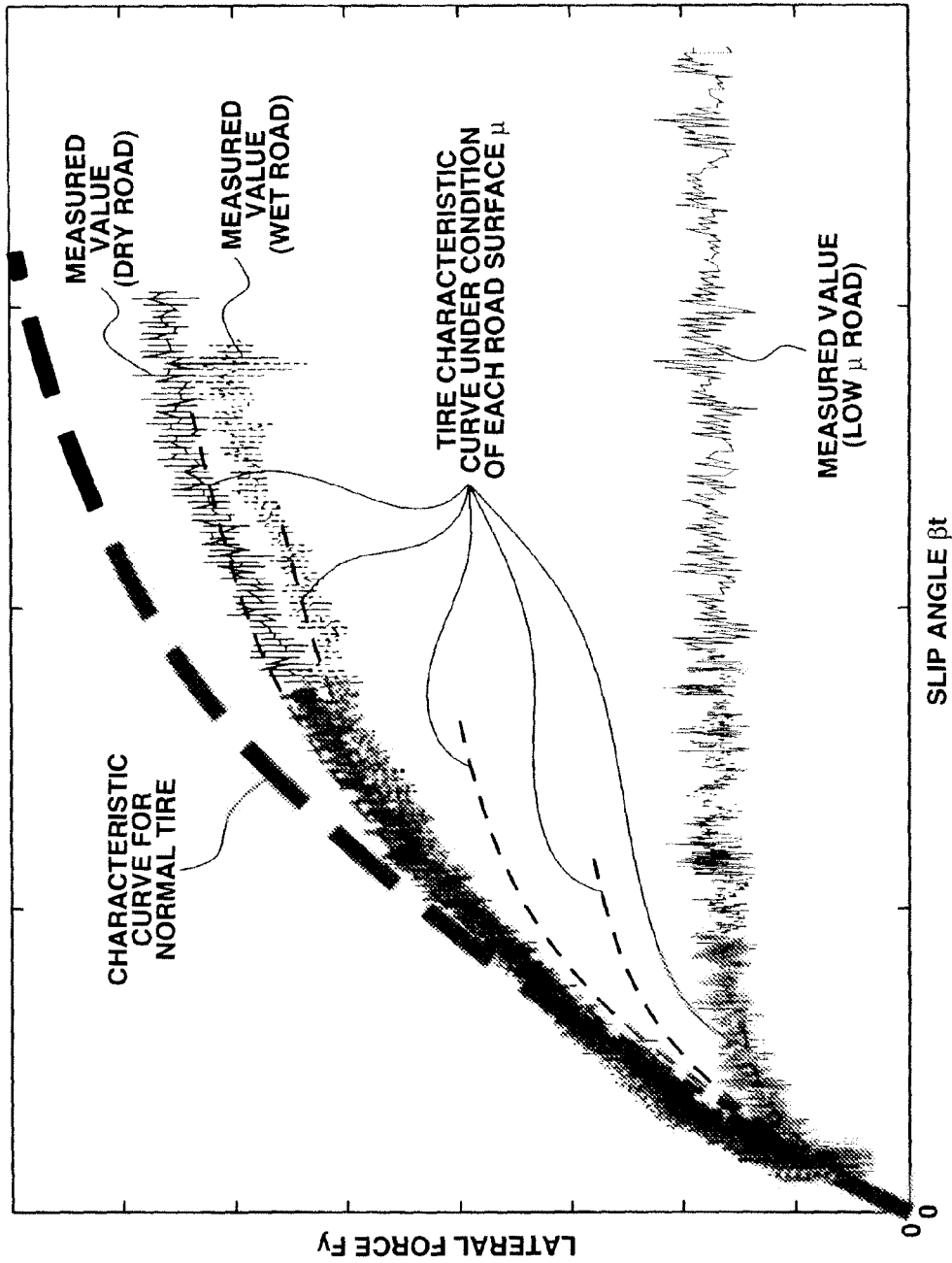
FIG. 7 is a characteristic diagram showing relationships between lateral force Fy and slip angle βt which are obtained under condition of road surfaces different in road surface μ in the case of a studless tire, which is used to explain the technique on which the present invention is based.

FIG. 7 shows relationships between lateral force Fy and slip angle βt which are obtained under condition of road surfaces different in road surface μ in the case of a studless tire. In FIG. 7, oscillating waves represent measured values under condition of a dry road, a wet road, and a low μ road, and dotted lines represent characteristic curves of the tire under condition of road surfaces. A bold dotted line represents the characteristic curve of a normal tire. As shown in FIG. 7, in the linear region, among the tire characteristic curves (narrow dotted lines) under condition of road surfaces different in road surface μ, lateral force Fy and slip angle βt decrease as road surface μ decreases, while the ratio (Fy/βt) between lateral force Fy and slip angle βt is maintained. Moreover, in the linear region, the ratio (Fy/βt) between lateral force Fy and slip angle βt of the characteristic curve of the normal tire (bold dotted line) is equal to the ratio (Fy/βt) between lateral force Fy and slip angle βt of the characteristic curve of the studless tire (narrow dotted lines). Namely, the characteristic curve of the normal tire and the characteristic curve of the studless tire have similar shapes. Namely, studless tires, which are different in gripping force, surface shape, etc., are also identical to normal tires in the ratio (Fy/βt) between lateral force Fy and slip angle βt of the characteristic curve.

Figure 8:
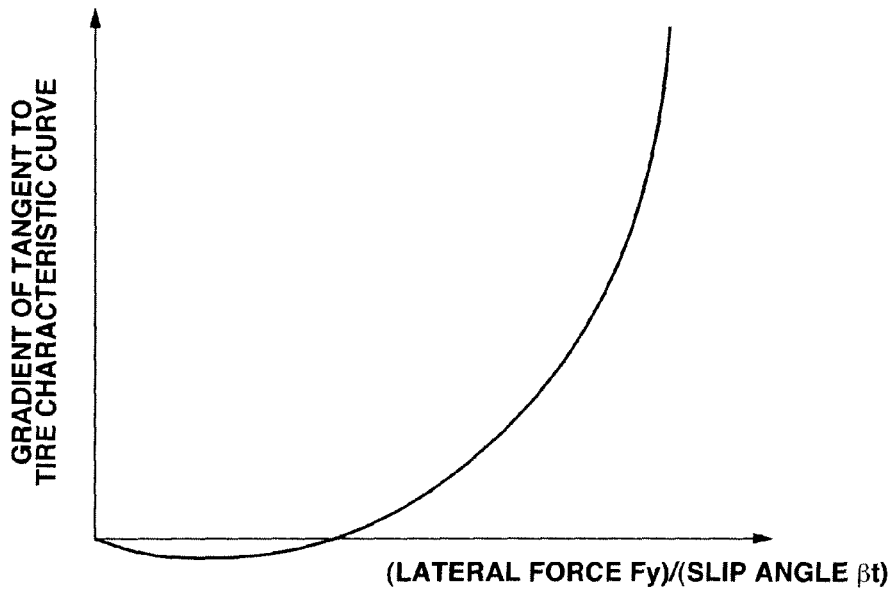
FIG. 8 is a characteristic diagram showing a relationship between a ratio between lateral force Fy and slip angle βt which correspond to a point at which an arbitrary straight line intersects with a tire characteristic curve, and the gradient of tangent to the tire characteristic curve at the intersection point, which is used to explain the technique on which the present invention is based.

FIG. 8 shows a relationship between the ratio (Fy/βt) between lateral force Fy and slip angle βt which correspond to a point at which an arbitrary straight line intersects with a tire characteristic curve, and the gradient of tangent to the tire characteristic curve at the intersection point (∂Fy/∂βt). As shown in FIG. 8, this characteristic curve shows that the ratio (Fy/βt) between lateral force Fy and slip angle βt and the gradient of tangent to the tire characteristic curve are in a specific relationship, irrespective of road surface μ (for example, μ=0.2, 0.5, 1.0). Accordingly, the characteristic curve shown in FIG. 8 holds even under condition of road surfaces different in road surface μ, such as dry asphalt road surfaces and frozen road surfaces.

In the case of the characteristic curve shown in FIG. 8, the gradient of tangent to the tire characteristic curve is negative in a region where the ratio (Fy/βt) between lateral force Fy and slip angle βt is small. In this region, as the ratio (Fy/βt) increases, the gradient of tangent to the tire characteristic curve decreases first, and then increases. Incidentally, when the gradient of tangent to the tire characteristic curve is negative, it means that the partial differential coefficient of lateral force with respect to slip angle is negative.

In a region where the ratio (Fy/βt) between lateral force Fy and slip angle βt is large, the gradient of tangent to the tire characteristic curve is positive. In this region, as the ratio (Fy/βt) increases, the gradient of tangent to the tire characteristic curve increases. Incidentally, when the gradient of tangent to the tire characteristic curve is positive, it means that the partial differential coefficient of lateral force with respect to slip angle is positive. When the gradient of tangent to the tire characteristic curve is maximum, it means that the gradient of tangent to the tire characteristic curve is within the linear region of the tire characteristic curve. Incidentally, in the linear region, the gradient of tangent to the tire characteristic curve is constantly equal to a specific value, irrespective of the ratio between lateral force Fy and slip angle βt.

As described above, the inventors of the present application have discovered that the gradient of a tangent to the tire characteristic curve under a condition of each road surface μ at an intersection point is identical, at which intersection point the tire characteristic curve intersects with an arbitrary straight line passing through the origin point of the tire characteristic curve. On the basis of this fact, the inventors of the present application have obtained a result such that the relationship between the ratio between the ratio (Fy/βt) between lateral force Fy and slip angle βt and the gradient of the tangent to the tire characteristic curve can be expressed by a specific characteristic curve, irrespective of road surface μ (see FIG. 8). Accordingly, if lateral force Fy and slip angle βt are determined, it is possible to obtain information about tire frictional state on the basis of the characteristic curve, while information about road surface μ is unnecessary.

The inventors of the present application have discovered that among tire characteristic curves differing in road surface μ, the ratio of lateral force Fy, and the ratio of slip angle βt between points (βt, Fy) of the tire characteristic curves at which the ratio (Fy/βt) between lateral force Fy and slip angle βt are identical to one another, are equal to the ratio of road surface μ between the tire characteristic curves. On the basis of this fact, if the ratio of lateral force Fy or the ratio of slip angle βt is determined, it is possible to determine the ratio of road surface μ. Accordingly, it is possible to estimate the road surface μ of a currently traveled road surface with reference to the tire characteristic curve under a condition of a specific value of road surface μ.

Figure 9:
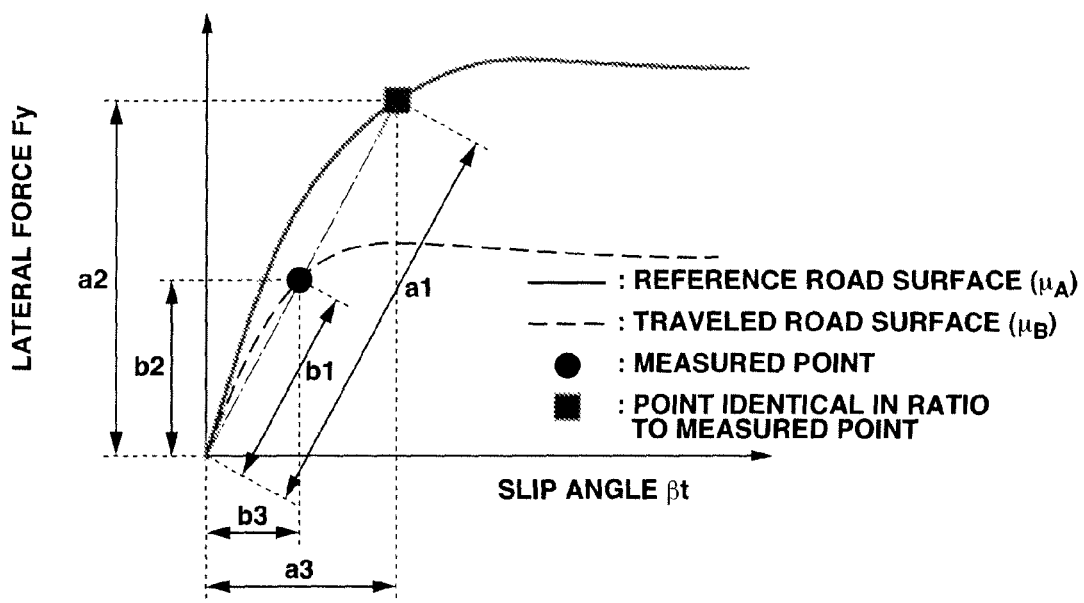
FIG. 9 is a diagram which is used to explain the technique on which the present invention is based, and which is used to explain a procedure of estimating the road surface μ of an actual traveled road surface with reference to a tire characteristic curve under condition of a specific road surface μ.

With reference to FIG. 9, the following describes a procedure of estimating the road surface μ of an actual traveled road surface (traveled road surface as a target of detection) with reference to the tire characteristic curve under condition of a specific value of road surface μ. First, it detects lateral force Fyb and slip angle βtb during traveling. The point (βtb, Fyb) corresponding to the detected lateral force Fyb and slip angle βtb (point indicated by a solid circle in FIG. 9) is on the tire characteristic curve under condition of road surface μ (of the actual traveled road surface) at the time of detection.

Subsequently, it calculates (determines) a point (βta, Fya) (point indicated by a solid box in FIG. 9) of the tire characteristic curve under condition of a road surface as a reference (reference road surface, for example, road surface where road surface μ is equal to 1), wherein the point is identical to the ratio (Fyb/βtb) between the detected lateral force Fyb and slip angle βtb. In the case of estimation based on line segment length, it calculates a ratio (b1/a1) between a line segment length b1 and a line segment length a1, wherein the line segment length b1 is between the origin point and the point (βtb, Fyb) corresponding to the detected lateral force Fyb and slip angle βtb, and the line segment length a1 is between the origin point of the tire characteristic curve under condition of the reference road surface and the point (βta, Fya) corresponding to the calculated values on the tire characteristic curve under condition of the reference road surface (the line segment length a1 is an extension of the line segment length b1). Then, it obtains a product ($\mu_A \cdot b1/a1$) of the calculated ratio (b1/a1) and the road surface μ value $\mu_A$ of the reference road surface, and estimates that the road surface μ value $\mu_B$ of the actual traveled road surface is equal to the product ($\mu_A \cdot b1/a1$).

In the case of estimation based on lateral force Fy, it calculates a ratio (b2/a2) between the magnitude b2 of the detected lateral force Fyb and the magnitude a2 of the lateral force Fya that corresponds to the point of the calculated values (βta, Fya) on the tire characteristic curve under condition of the reference road surface. It obtains a product ($\mu_A \cdot b2/a2$) of the calculated ratio (b2/a2) and the road surface μ value $\mu_A$ of the reference road surface, and estimates that the road surface μ value $\mu_B$ of the actual traveled road surface is equal to the product ($\mu_A \cdot b2/a2$). Each of a2 and b2 represents a magnitude of lateral force, and corresponds to the line segment length a2 or line segment length b2 in FIG. 9, wherein the ratio between a2 and b2 is equal to the ratio between the line segment length a1 and line segment length b1.

In the case of estimation based on slip angle βt, it calculates a ratio (b3/a3) between the magnitude b3 of the detected slip angle βtb and the magnitude a3 of the slip angle βta that corresponds to the point of the calculated values (βta, Fya) on the tire characteristic curve under condition of the reference road surface. It obtains a product ($\mu_A \cdot b3/a3$) of the calculated ratio (b3/a3) and the road surface μ value $\mu_A$ of the reference road surface, and estimates that the road surface μ value $\mu_B$ of the actual traveled road surface is equal to the product ($\mu_A \cdot b3/a3$). Each of a3 and b3 represents a magnitude of slip angle, and corresponds to the line segment length a3 or line segment length b3 in FIG. 9, wherein the ratio between a3 and b3 is equal to the ratio between the line segment length a1 and line segment length b1.

Incidentally, the procedures of estimation based on lateral force Fy, slip angle βt, and line segment length are physically equivalent to one another although they are different in expression.

According to the procedures described above, it is possible to estimate the road surface μ of an actual traveled road surface with reference to a tire characteristic curve under condition of a specific value of road surface μ.

EMBODIMENT(S)

The following describes embodiments implemented with the technique described above.

First Embodiment

Figure 10:
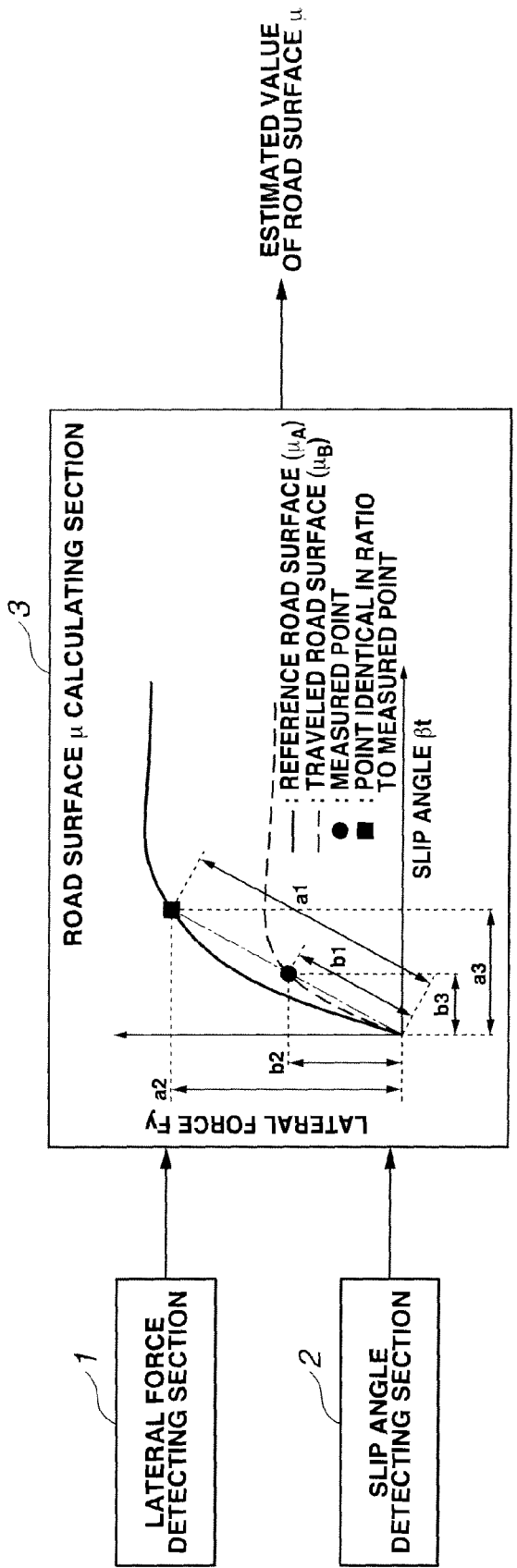
FIG. 10 is a block diagram showing configuration of a road surface friction coefficient estimating device according to a first embodiment of the present invention.

The first embodiment is a road surface friction coefficient estimating device applied with the present invention.
<Configuration> FIG. 10 shows configuration of the road surface friction coefficient estimating device according to the first embodiment. For example, the road surface friction coefficient estimating device is mounted on a vehicle in which running control is performed on the basis of road surface μ. As shown in FIG. 10, the road surface friction coefficient estimating device includes a lateral force detecting section 1, a slip angle detecting section 2, and a road surface μ calculating section 3. Lateral force detecting section 1 detects lateral force. For example, lateral force detecting section 1 detects the lateral force on the basis of an output of a driving source. Lateral force detecting section 1 outputs the detected lateral force to road surface μ calculating section 3. Slip angle detecting section 2 detects slip angle. Slip angle detecting section 2 detects the slip angle on the basis of a difference between wheel speed and vehicle speed. Slip angle detecting section 2 outputs the detected slip angle to road surface p calculating section 3.

Road surface μ calculating section 3 stores a tire characteristic curve under a condition of a reference road surface in the form of a characteristic map by a storing means such as a memory. The tire characteristic curve under the condition of the reference road surface is shown in FIG. 9. The tire characteristic curve under the condition of the reference road surface which forms the characteristic map is obtained beforehand, for example, by a running test of the vehicle. For example, the running test is implemented by an acceleration circular turning running test. The tire characteristic curve under the condition of the reference road surface is obtained based on a relationship between change in slip angle and change in lateral force which is obtained by the acceleration circular turning running test under the condition of the reference road surface. Alternatively, the tire characteristic curve under the condition of the reference road surface may be obtained by calculation such as simulation instead of the running test. When the reference road surface is high in road surface μ, such as a dry asphalt (μ=1), it is possible to obtain the tire characteristic curve with high accuracy, because it is possible to relatively suppress the influence of disturbances such as noise from measurement equipment during the running test.

Road surface μ calculating section 3 calculates an estimated value of the road surface μ of the actual traveled road surface on the basis of the thus-obtained characteristic map of the tire characteristic curve under condition of the reference road surface. The detailed calculating operation of road surface μ calculating section 3 is described by describing procedural steps in the following.

Figure 13:
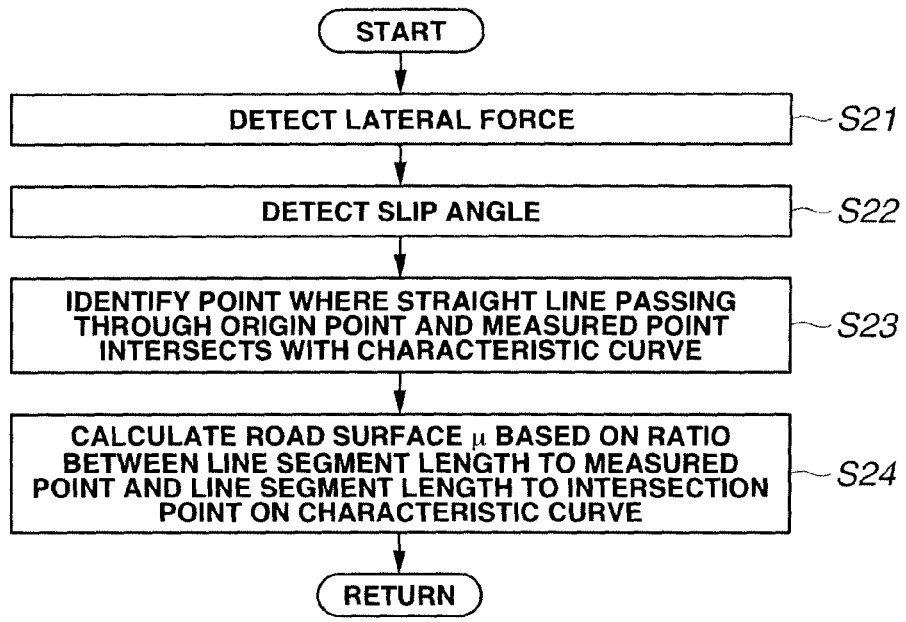
FIG. 13 is a flow chart showing a procedure of calculating an estimated value of road surface μ on a basis of a line segment length of a straight line connecting a measured point and an origin point of a tire characteristic curve.

FIG. 13 shows a procedure for a case of calculating an estimated value of road surface μ of an actual traveled road surface on the basis of line segment length. As shown in FIG. 13, first after the procedure is started, the road surface μ calculating section 3 detects lateral force Fyb and slip angle βtb at Steps S21 and S22.

Subsequently, at Step S23, road surface μ calculating section 3 determines values (βta, Fya) corresponding to a point at which the tire characteristic curve under condition of the reference road surface intersects with a straight line passing through the origin point (0, 0) of the tire characteristic curve under condition of the reference road surface and a measured point. "Measured point" means a point (βtb, Fyb) in the characteristic map which corresponds to the lateral force Fyb and slip angle βtb detected at Steps S21 and S22.

Subsequently, at Step S24, road surface μ calculating section 3 calculates an estimated value of the road surface μ value $\mu_B$ of the actual traveled road surface. Specifically, road surface μ calculating section 3 calculates a ratio (Lb/La) between a line segment length Lb ($=\sqrt{(\beta tb^2 + Fyb^2)}$) and a line segment length La ($=\sqrt{(\beta ta^2 + Fya^2)}$), wherein the line segment length Lb is of a straight line connected between the origin point of the tire characteristic curve under condition of the reference road surface and the measured point (βtb, Fyb), and the line segment length La is of a straight line connected between the origin point of the tire characteristic curve under condition of the reference road surface and the intersection point (βta, Fya) on the tire characteristic curve under condition of the reference road surface which is determined at Step S23. Then, road surface μ calculating section 3 obtains a product of the calculated ratio (Lb/La) and the road surface μ value $\mu_A$ of the reference road surface obtained from the characteristic map (tire characteristic curve), and estimates that the road surface μ value $\mu_B$ of the actual traveled road surface is equal to the product ($\mu_B = \mu_A \cdot Lb/La$). In the equation, the coefficient of road surface μ value $\mu_A$ (i.e. (Lb/La)) is referred to as "ratio to reference". In this way, road surface μ calculating section 3: calculates as a first distance a distance in a coordinate plane between a detected point and a point at which lateral force is equal to zero; calculates as a second distance a distance in the coordinate plane between a reference point and a point at which the lateral force is equal to zero; and calculates the ratio to reference on a basis of the first and second distances.

The estimated value of road surface μ of the actual traveled road surface is calculated according to the foregoing procedure. In other words, it estimates the relationship between the detected lateral force Fyb and slip angle βtb under condition of the road surface μ of the actual traveled road surface. For example, it is possible to estimate a maximum road surface μ at which lateral force is equal to an allowable maximum value, under condition of the actual traveled road surface. For example, on the basis of the relationship between lateral force Fyb and slip angle βtb detected as shown in FIG. 9, it is possible to estimate the maximum road surface μ which corresponds to the boundary where the change in lateral force Fyb with respect to increase in slip angle βtb turns from increasing to decreasing.

Figure 11:
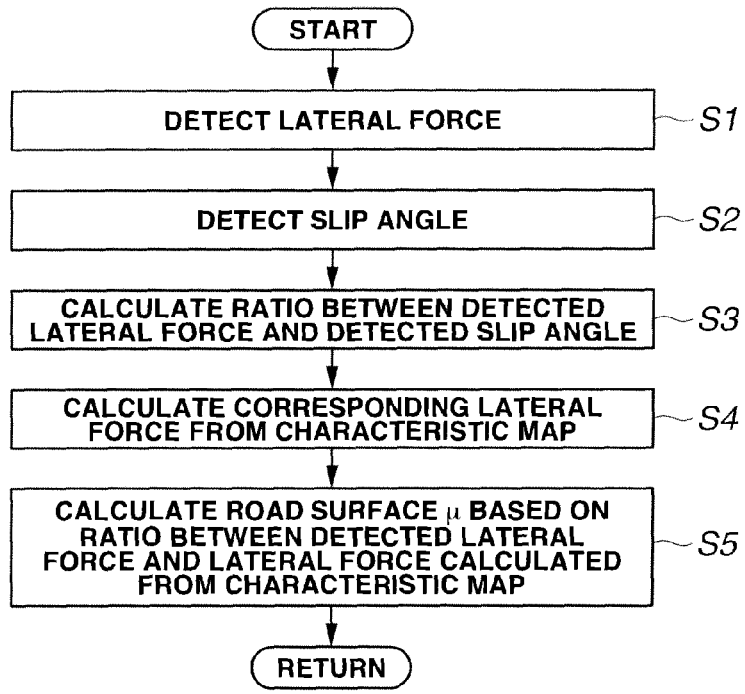
FIG. 11 is a flow chart showing a procedure of calculating an estimated value of road surface μ on a basis of a detected lateral force Fyb.

The first embodiment can be implemented by the following configuration. Specifically, it is possible to calculate an estimated value of road surface μ of an actual traveled road surface on the basis of lateral force. FIG. 11 shows a procedure of calculating an estimated value of road surface μ of an actual traveled road surface. As shown in FIG. 11, first after the procedure is started, lateral force detecting section 1 detects lateral force Fyb at Step S1. Subsequently, at Step S2, slip angle detecting section 2 detects slip angle βtb.

Subsequently, at Step S3, road surface μ calculating section 3 calculates the ratio (Fyb/βtb) between the lateral force Fyb and slip angle βtb detected at Steps S1 and S2. Subsequently, at Step S4, road surface μ calculating section 3 calculates a corresponding lateral force Fya from the tire characteristic curve under condition of the reference road surface in the form of the characteristic map. Namely, road surface μ calculating section 3 determines the lateral force Fya and slip angle βta whose ratio is identical to the ratio (Fyb/βtb) between the lateral force Fyb and slip angle βtb that is calculated at Step S3, and thus obtains the lateral force Fya.

Subsequently, at Step S5, road surface μ calculating section 3 calculates an estimated value of the road surface μ value $\mu_B$ of the actual traveled road surface. Specifically, road surface μ calculating section 3 obtains a product of the ratio (Fyb/Fya) between the lateral force Fyb detected at Step S1 and the lateral force Fya calculated from the characteristic map at Step S4, and the road surface μ value $\mu_A$ of the reference road surface obtained from the characteristic map (tire characteristic curve), and obtains the estimated value $\mu_B$ of the road surface μ of the actual traveled road surface that is equal to the product ($\mu_B = \mu_A \cdot Fyb/Fya$).

Figure 12:
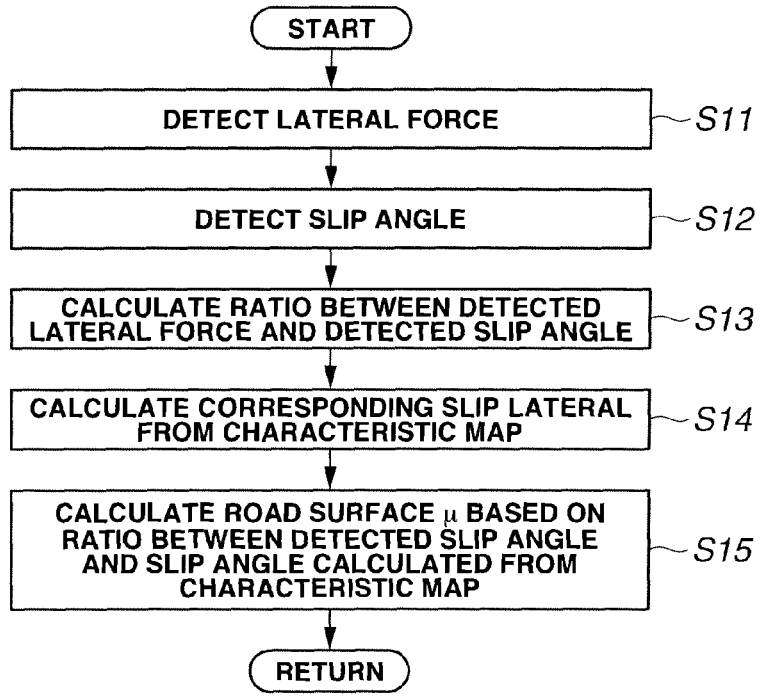
FIG. 12 is a flow chart showing a procedure of calculating an estimated value of road surface μ on a basis of a detected slip angle βtb.

The first embodiment can be implemented by the following configuration. Specifically, it is possible to calculate an estimated value of road surface μ of an actual traveled road surface on the basis of slip angle. FIG. 12 shows a procedure for a case of calculating an estimated value of road surface μ of an actual traveled road surface. As shown in FIG. 12, first after the procedure is started, road surface μ calculating section 3 detects lateral force Fyb and slip angle βtb at Steps S11 and S12, as in FIG. 11. Subsequently, at Step S13, road surface μ calculating section 3 calculates a ratio (Fyb/βtb) between the lateral force Fyb and slip angle βtb detected at Steps S11 and S12, as in FIG. 11.

Subsequently, at Step S14, road surface μ calculating section 3 calculates a corresponding slip angle βta from the tire characteristic curve under condition of the reference road surface in the form of the characteristic map. Namely, road surface μ calculating section 3 determines the lateral force Fya and slip angle βta whose ratio is identical to the ratio (Fyb/βtb) between the lateral force Fyb and slip angle βtb that is calculated at Step S13, and thus obtains the slip angle βta.

Subsequently, at Step S15, road surface μ calculating section 3 calculates an estimated value of the road surface μ value $\mu_B$ of the actual traveled road surface. Specifically, road surface μ calculating section 3 obtains a product of the ratio (βtb/βta) between the slip angle βtb detected at Step S12 and the slip angle βta calculated from the characteristic map at Step S14, and the road surface μ value $\mu_A$ of the reference road surface obtained from the characteristic map (tire characteristic curve), and obtains the estimated value $\mu_B$ of the road surface μ of the actual traveled road surface that is equal to the product ($\mu_B = \mu_A \cdot \beta tb/\beta ta$).

This embodiment is described in the case where the tire characteristic curve has a horizontal axis representing the slip angle βt and a vertical axis representing the lateral force Fy. This may be modified so that the tire characteristic curve is expressed in another form.

Figure 14:
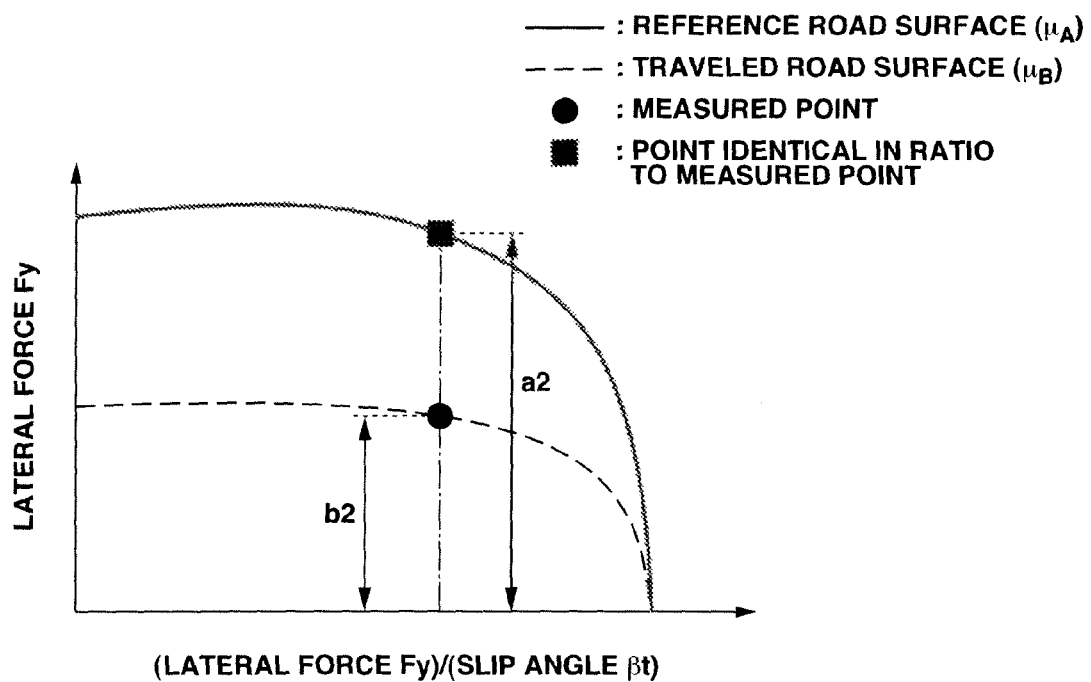
FIG. 14 is a characteristic diagram showing a tire characteristic curve (characteristic map) which has a horizontal axis representing the ratio (Fy/βt) between lateral force Fy and slip angle βt, and a vertical axis representing the lateral force Fy.

FIG. 14 shows another example of tire characteristic curve which has a horizontal axis representing the ratio (Fy/βt) between lateral force Fy and slip angle βt, and a vertical axis representing the lateral force Fy. Road surface μ calculating section 3 calculates an estimated value of the road surface μ value $\mu_B$ of the actual traveled road surface on the basis of the characteristic map composed of the tire characteristic curve under condition of the reference road surface shown in FIG. 14. Specifically, as described in the foregoing embodiment, road surface μ calculating section 3 detects lateral force Fyb and slip angle βtb. Road surface μ calculating section 3 determines the lateral force Fya (a2) with which the ratio is identical to the ratio (Fyb/βtb) between the detected lateral force Fyb and slip angle βtb. Subsequently, road surface μ calculating section 3 obtains a product of the ratio (Fyb/Fya (=b2/a2)) between the detected lateral force Fyb (b2) and the lateral force Fya determined from the tire characteristic curve, and the road surface μ value $\mu_A$ of the reference road surface obtained from the tire characteristic curve, and obtains the estimated value $\mu_B$ of the road surface μ of the actual traveled road surface that is equal to the product ($\mu_B=\mu_A \cdot Fyb/Fya$).

Figure 15:
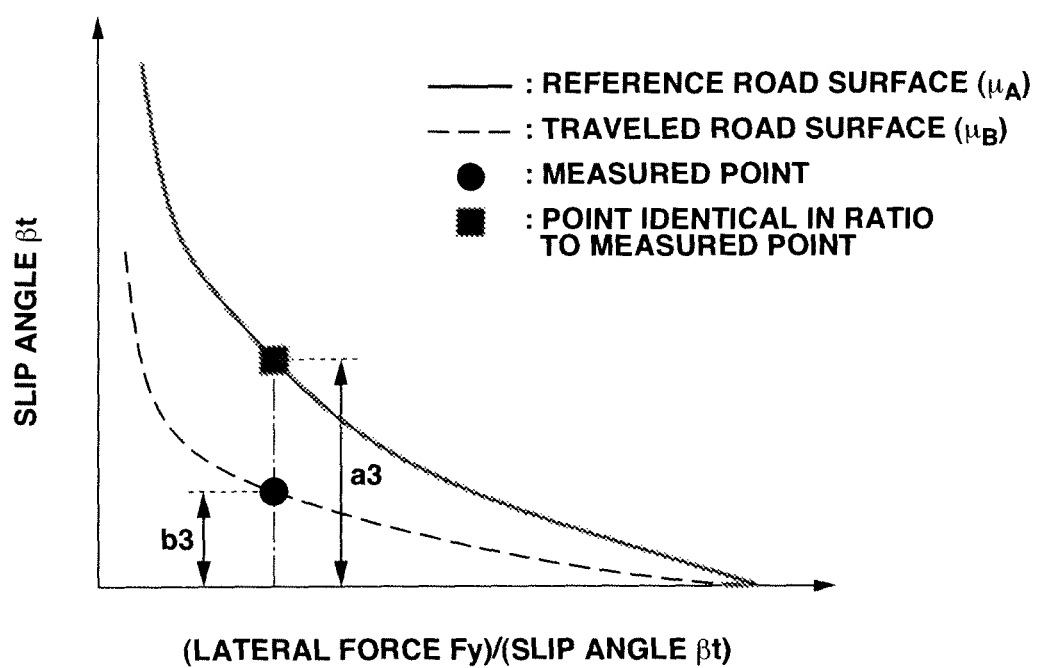
FIG. 15 is a characteristic diagram showing a tire characteristic curve (characteristic map) which has a horizontal axis representing the ratio (Fy/βt) between lateral force Fy and slip angle βt, and a vertical axis representing the slip angle βt.

Moreover, FIG. 15 shows another example of tire characteristic curve which has a horizontal axis representing the ratio (Fy/βt) between lateral force Fy and slip angle βt, and a vertical axis representing the slip angle βt. Road surface μ calculating section 3 calculates an estimated value of the road surface μ value $\mu_B$ of the actual traveled road surface on the basis of the characteristic map composed of the tire characteristic curve under condition of the reference road surface shown in FIG. 15. Specifically, as described in the foregoing embodiment, road surface μ calculating section 3 detects lateral force Fyb and slip angle βtb. Road surface μ calculating section 3 determines the slip angle βta (a3) with which the ratio is identical to the ratio (Fyb/βtb) between the detected lateral force Fyb and slip angle βtb. Subsequently, road surface μ calculating section 3 obtains a product of the ratio (βtb/βta (=b3/a3)) between the detected slip angle βtb (b2) and the slip angle βta determined from the tire characteristic curve, and the road surface μ value $\mu_A$ of the reference road surface obtained from the tire characteristic curve, and obtains the estimated value $\mu_B$ of the road surface μ of the actual traveled road surface that is equal to the product ($\mu_B=\mu_A \cdot \beta tb/\beta ta$).

The first embodiment is described with reference to the case where the characteristic map is used. This may be implemented by another method. Specifically, this may be implemented using a mathematical expression. The mathematical expression provides a tire characteristic curve as in the form of characteristic map, wherein wheel lateral force and wheel slip angle are variables. As in the case of the characteristic map, the road surface μ of an actual traveled road surface is estimated on the basis of the tire characteristic curve provided by the mathematical expression and the detected lateral force and slip angle, for example, by means of simultaneous equations.

The first embodiment is described with reference to the case where the reference road surface, under condition of which the tire characteristic curve (characteristic map, etc.) is obtained, has a high road surface μ. However, in consideration of the principle, the road surface μ of the reference road surface is unlimited, if it is possible to estimate the road surface μ of the actual traveled road surface on the basis of the ratio between the road surface μ of the reference road surface and the road surface μ of the actual traveled road surface. For example, it is possible to obtain a tire characteristic curve (characteristic map, etc.) under condition of a reference road surface having a low road surface μ, such as a wet road surface or a frozen road surface.

In the first embodiment, lateral force detecting section 1 implements a lateral force detecting means for detecting the lateral force of a wheel. Slip angle detecting section 2 implements a slip angle detecting means for detecting the slip angle of the wheel. Road surface μ calculating section 3 (particularly, the storing means for storing the characteristic map, wherein the storing means is a memory, for example) implements a correlation obtaining means for obtaining a correlation (or a reference curve representing the correlation) between the lateral force of the wheel and the slip angle of the wheel under condition of a reference road surface. Moreover, road surface μ calculating section 3 implements a ratio calculating means for calculating a ratio between the lateral force detected by the lateral force detecting means and the slip angle detected by the slip angle detecting means. Moreover, road surface μ calculating section 3 implements a road surface friction coefficient estimating means for estimating a relationship between the lateral force and slip angle on the basis of the ratio calculated by the ratio calculating means, the correlation obtained by the correlation obtaining means, and at least one of the lateral force detected by the lateral force detecting means and the slip angle detected by the slip angle detecting means.

In the first embodiment, road surface μ calculating section 3 (particularly, the storing means for storing the characteristic map, wherein the storing means is a memory, for example) implements a characteristic curve obtaining means for obtaining a characteristic curve that represents a relationship between the lateral force of a wheel and the slip angle of the wheel under condition of a reference road surface. Lateral force detecting section 1 implements a lateral force detecting means for detecting the lateral force of the wheel during traveling. Slip angle detecting section 2 implements a slip angle detecting means for detecting the slip angle of the wheel during traveling. Road surface μ calculating section 3 implements: a ratio calculating means for calculating a ratio between the lateral force detected by the lateral force detecting means and the slip angle detected by the slip angle detecting means; a determining means for determining the lateral force of the wheel or the slip angle of the wheel on the characteristic curve obtained by the characteristic curve obtaining means, wherein the ratio between the lateral force of the wheel and the slip angle of the wheel is identical to the ratio calculated by the ratio calculating means; and an actual road surface μ calculating means for calculating an actual road surface μ of a traveled road surface, on the basis of the ratio between the lateral force of the wheel determined by the determining means and the lateral force detected by the lateral force detecting means or the ratio between the slip angle determined by the determining means and the slip angle detected by the slip angle detecting means, and the road surface μ of the reference road surface.

The first embodiment implements a road surface friction coefficient estimating method comprising: detecting the lateral force and slip angle of a wheel; calculating a ratio between the detected lateral force and slip angle; and estimating a relationship between the lateral force and the slip angle, on the basis of the calculated ratio, a correlation between the lateral force of the wheel and the slip angle of the wheel under condition of a reference road surface, and at least one of the detected lateral force and slip angle.

The first embodiment implements a road surface friction coefficient estimating method comprising: detecting the lateral force and slip angle of a wheel; calculating a ratio between the detected lateral force and slip angle; determining the lateral force of the wheel or the slip angle of the wheel on a characteristic curve, wherein the ratio between the lateral force of the wheel and the slip angle of the wheel is identical to the calculated ratio, and wherein the characteristic curve is obtained as a relationship between the lateral force and slip angle of the wheel under condition of a reference road surface; and calculating an actual road surface μ of a traveled road surface, on the basis of the ratio between the determined lateral force of the wheel and the detected lateral force of the wheel or the ratio between the determined slip angle of the wheel and the detected slip angle of the wheel, and the road surface μ of the reference road surface.

<Operation and Effect> The first embodiment operates and produces effects as follows.

<1> It detects the lateral force and slip angle of a wheel during traveling, and calculates a ratio between the detected wheel lateral force and wheel slip angle. Then, it estimates a relationship between the lateral force and the slip angle on a basis of the calculated ratio, a tire characteristic curve, and at least one of the detected lateral force and slip angle, wherein the tire characteristic curve is obtained as a correlation between the lateral force of the wheel and the slip angle of the wheel under condition of a reference road surface. This makes it possible to estimate on the basis of the ratio between the lateral force and slip angle the road surface μ that changes every moment, if the lateral force and slip angle can be detected. Namely, it is possible to estimate the road surface μ before the occurrence of slippage. Accordingly, it is possible to estimate the relationship between the slip angle and the road surface μ of a traveled road surface (or lateral force).

Specifically, it detects the lateral force and slip angle of a wheel during traveling, and calculates a ratio between the detected wheel lateral force and wheel slip angle. Moreover, it determines the lateral force of the wheel or the slip angle of the wheel on a tire characteristic curve, wherein the ratio between the lateral force of the wheel and the slip angle of the wheel is identical to the calculated ratio, and wherein the tire characteristic curve is obtained as a relationship between the lateral force of the wheel and the slip angle of the wheel under condition of a reference road surface. Then, it calculates an actual road surface μ of a traveled road surface on the basis of the ratio between the determined lateral force of the wheel and the detected lateral force or the ratio between the determined slip angle and the detected slip angle, and the road surface μ of the reference road surface. This makes it possible to calculate on the basis of the ratio between the lateral force and slip angle the actual road surface μ of the traveled road surface, if the lateral force and slip angle can be detected. Accordingly, it is possible to estimate the road surface μ of the traveled road surface before the occurrence of slippage.

Moreover, it is possible to easily estimate the road surface μ of the traveled road surface by using the tire characteristic curve under condition of the reference road surface, wherein it is sufficient to obtain a tire characteristic curve under condition of a specific single road surface. For example, a method is conceivable of: having obtained tire characteristic curves under condition of road surfaces different in road surface μ; and estimating the road surface μ of an actual traveled road surface by interpolation between the existing tire characteristic curves, when there is no tire characteristic curve to obtain the road surface μ of the actual traveled road surface. However, in such a case, the accuracy of estimating the road surface μ is low, because of the use of a plurality of tire characteristic curves, the interpolation, etc. In contrast, in the case of the present invention, it is possible to estimate the road surface μ of the traveled road surface easily and accurately, because the road surface μ of the traveled road surface can be estimated only on the basis of the tire characteristic curve under condition of a specific single road surface.

<2> It estimates a relationship between the detected lateral force and the detected slip angle, using a characteristic map composed of a tire characteristic curve that has a coordinate axis representing the lateral force and a coordinate axis representing the slip angle. This makes it possible to easily estimate the road surface μ that changes every moment.

<3> It estimates a relationship between the detected lateral force and the detected slip angle, using a characteristic map composed of a tire characteristic curve that has a coordinate axis representing the ratio between lateral force and slip angle, and a coordinate axis representing the lateral force. This makes it possible to easily estimate the road surface μ that changes every moment.

<4> It estimates a relationship between the detected lateral force and the detected slip angle, using a characteristic map composed of a tire characteristic curve that has a coordinate axis representing the ratio between lateral force and slip angle, and a coordinate axis representing the slip angle. This makes it possible to easily estimate the road surface μ that changes every moment.

<5> It obtains a tire characteristic curve in the form of a mathematical expression wherein lateral force and slip angle are variables. This makes it possible to easily estimate the road surface μ that changes every moment.

Second Embodiment

The second embodiment is an electric drive vehicle applied with the present invention.

Figure 16:
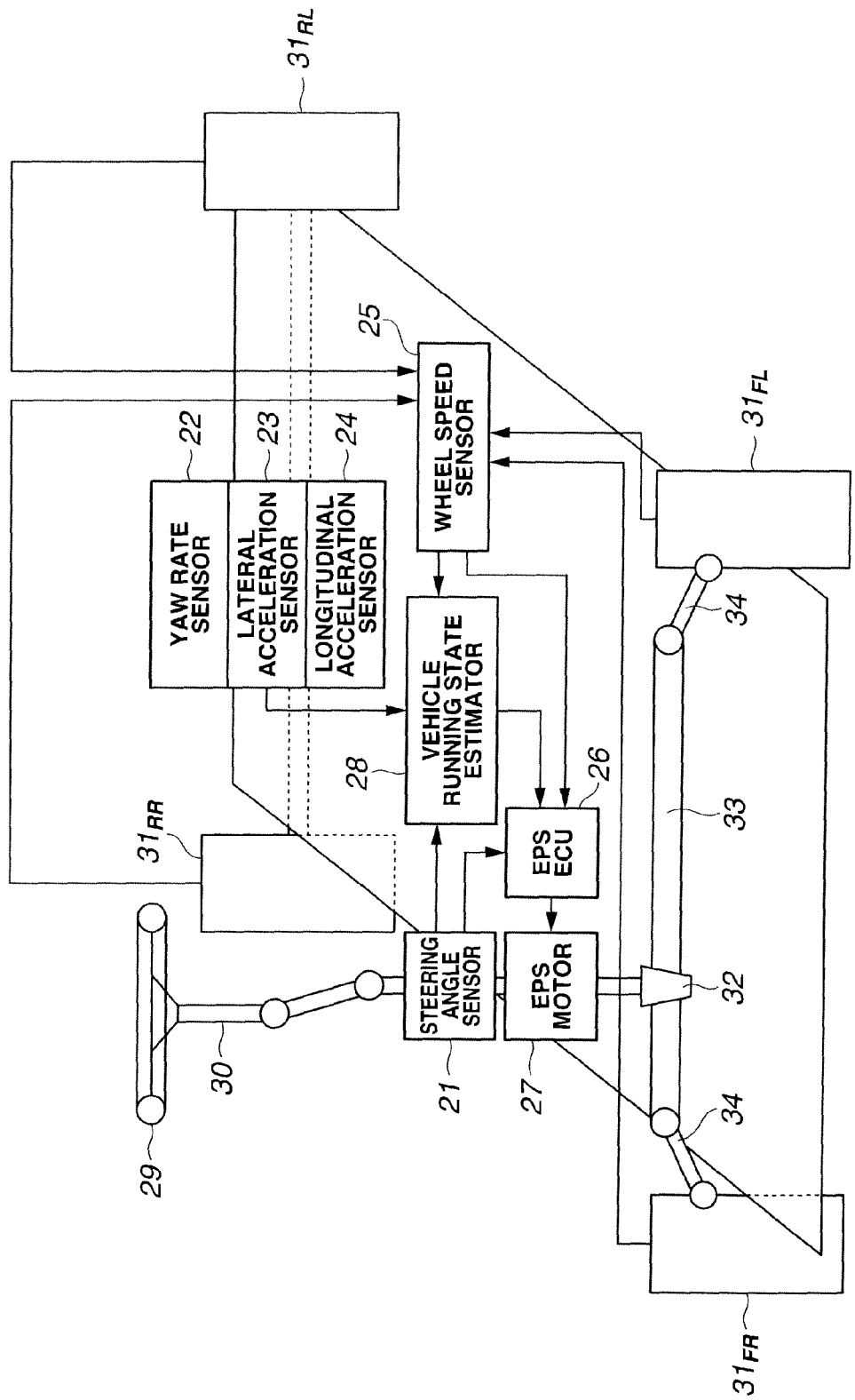
FIG. 16 is a diagram showing schematic configuration of a vehicle according to a second embodiment of the present invention.

<Configuration> FIG. 16 shows schematic configuration of the vehicle according to the second embodiment. As shown in FIG. 16, the vehicle includes a steering angle sensor 21, a yaw rate sensor 22, a lateral acceleration sensor 23, a longitudinal acceleration sensor 24, a wheel speed sensor 25, an EPSECU (Electric Power Steering Electronic Control Unit) 26, an EPS (Electric Power Steering) motor 27, and a vehicle running state estimator 28.

Steering angle sensor 21 detects the rotational angle of a steering shaft 30 that rotates together with a steering wheel 29. Steering angle sensor 21 outputs a result of the detection (steering angle) to vehicle running state estimator 28. Yaw rate sensor 22 detects the yaw rate of the vehicle. Yaw rate sensor 22 outputs a result of the detection to vehicle running state estimator 28. Lateral acceleration sensor 23 detects the lateral acceleration of the vehicle. Lateral acceleration sensor 23 outputs a result of the detection to vehicle running state estimator 28. Longitudinal acceleration sensor 24 detects the longitudinal acceleration of the vehicle. Longitudinal acceleration sensor 24 outputs a result of the detection to vehicle running state estimator 28. Wheel speed sensor 25 detects the wheel speeds of wheels $31_{FL}$, $31_{FR}$, $31_{RL}$ and $31_{RR}$ of the vehicle. Wheel speed sensor 25 outputs a result of the detection to vehicle running state estimator 28.

EPSECU 26 outputs a steering assist command to EPS motor 27 on the basis of the steering angle detected by steering angle sensor 21. The steering assist command is in the form of a command signal for steering torque assist. EPSECU 26 outputs the steering assist command to EPS motor 27 on the basis of an estimated value of road surface μ (described below) that is outputted by vehicle running state estimator 28.

EPS motor 27 applies torque to rotate the steering shaft 30 on the basis of the steering assist command outputted by EPSECU 26. EPS motor 27 thus assists steering operation of left and right front wheels $31_{FL}$ and $31_{FR}$ through a rack-and-pinion mechanism (a pinion 32 and a rack 33), a tie rod 14, and a knuckle arm 15, wherein the rack-and-pinion mechanism is coupled to steering shaft 30.

Vehicle running state estimator 28 estimates a state (road surface μ) of a traveled road surface on the basis of the results of detection by steering angle sensor 21, yaw rate sensor 22, lateral acceleration sensor 23, longitudinal acceleration sensor 24, and wheel speed sensor 25. Vehicle running state estimator 28 outputs a result of the estimation to EPSECU 26.

Figure 17:
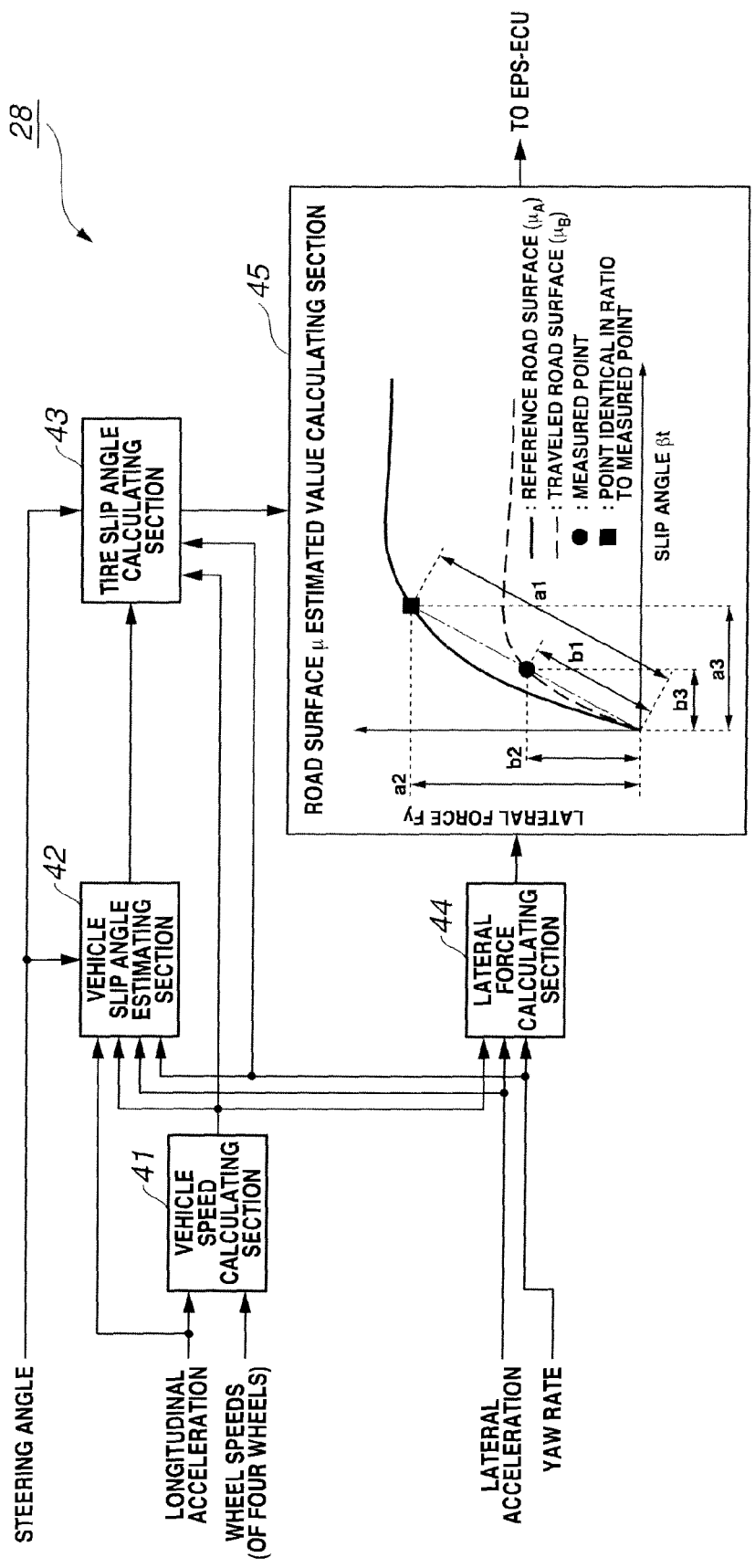
FIG. 17 is a block diagram showing configuration of a vehicle running state estimator.

FIG. 17 shows internal configuration of vehicle running state estimator 28. As shown in FIG. 17, vehicle running state estimator 28 includes a vehicle speed calculating section 41, a vehicle slip angle estimating section 42, a tire slip angle calculating section 43, a tire lateral force calculating section 44, and a road surface μ estimated value calculating section 45.

Vehicle speed calculating section 41 estimates vehicle speed on the basis of the wheel speeds detected by wheel speed sensor 25 and the longitudinal acceleration detected by longitudinal acceleration sensor 24. Specifically, vehicle speed calculating section 41 calculates an average value of the wheel speeds of non-driving wheels $31_{RL}$ and $31_{RR}$, or an average value of the wheel speeds of wheels $31_{FL}$, $31_{FR}$, $31_{RL}$ and $31_{RR}$, and sets a base value of vehicle speed to the average value. Vehicle speed calculating section 41 corrects the base value on the basis of the longitudinal acceleration. Specifically, vehicle speed calculating section 41 corrects the base value so as to eliminate the influence of errors due to tire slippage during rapid acceleration or tire locking during rapid braking. Vehicle speed calculating section 41 obtains the corrected value as a result of detection of vehicle speed. Vehicle speed calculating section 41 outputs the result of detection to vehicle slip angle estimating section 42 and slip angle calculating section 44.

Vehicle slip angle estimating section 42 estimates the sideslip angle (slip angle) of the vehicle on the basis of the steering angle detected by steering angle sensor 21, the yaw rate detected by yaw rate sensor 22, the lateral acceleration detected by lateral acceleration sensor 23, the longitudinal acceleration detected by longitudinal acceleration sensor 24, and the vehicle speed calculated by vehicle speed calculating section 41.

Figure 18:
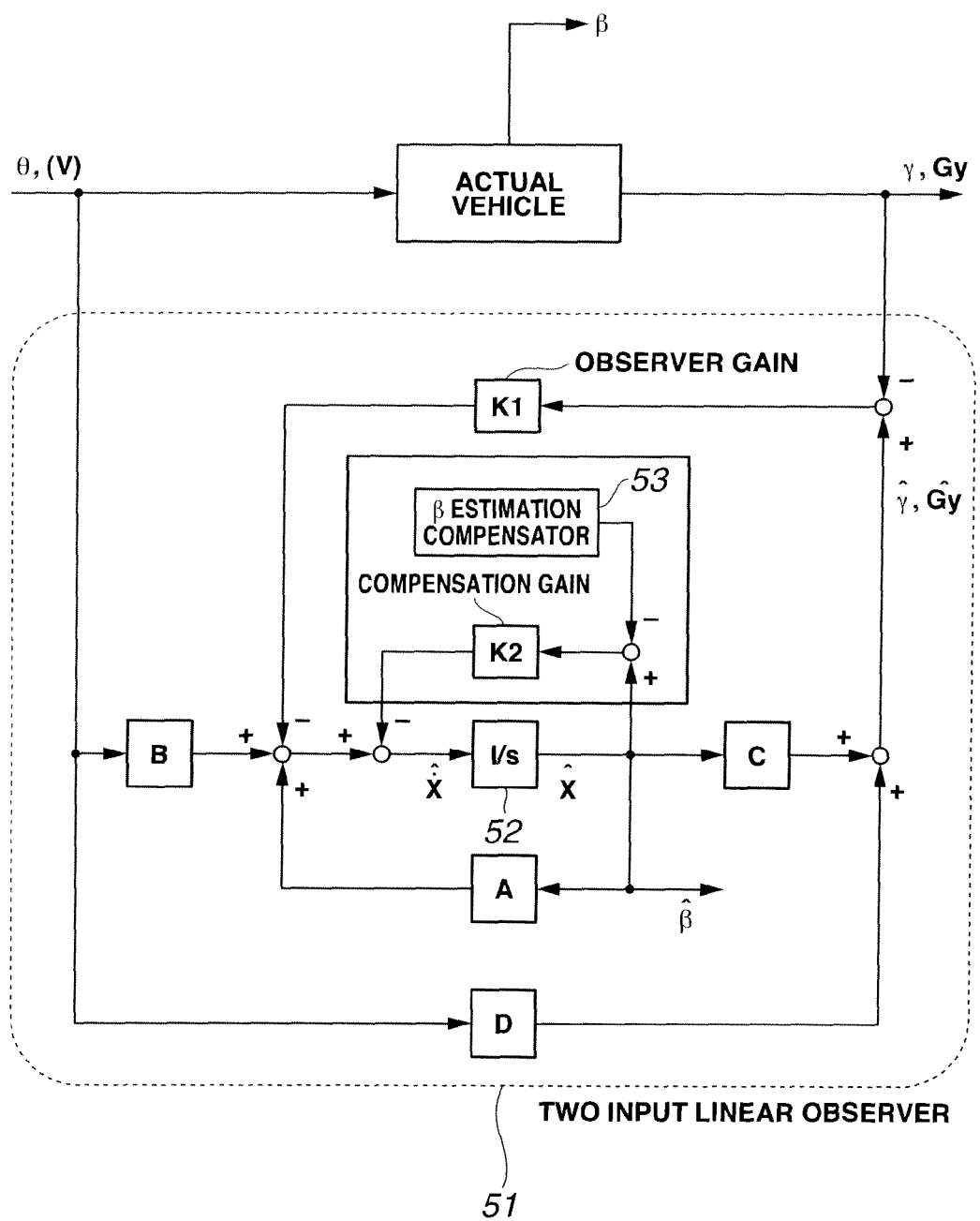
FIG. 18 is a block diagram showing configuration of a vehicle slip angle estimating section.

FIG. 18 shows an example of configuration of vehicle slip angle estimating section 42. As shown in FIG. 18, vehicle slip angle estimating section 42 includes a two-input linear observer 51 that estimates a quantity of state (vehicle sideslip angle β, slip angle β) of the vehicle. With two-input linear observer 51, vehicle slip angle estimating section 42 estimates the vehicle sideslip angle (slip angle) β. Two-input linear observer 51 is configured on the basis of a two-wheel vehicle model. The two-wheel vehicle model is expressed by the following equation (1) in view of balance in force in the lateral direction and moment about the vehicle.

$$mV(\dot{\beta}+\gamma)=-Cp_f(\beta+l_f\gamma/V-\delta)-Cp_r(\beta-l_r\gamma/V)$$

$$I\dot{\gamma}=-Cp_f(\beta+l_f\gamma/V-\delta)l_f+Cp_r(\beta-l_r\gamma/V)l_r \quad (1)$$

In equation (1), A, B, C and D represent matrixes that are determined according to a linear two-wheel vehicle model. The equation of state (output equation) of equation (1) is expressed by the following equation (2) with an input u of tire steer angle and an output y of yaw rate and lateral acceleration.

$$\dot{x}=Ax+Bu, x=\begin{pmatrix}\beta\\\gamma\end{pmatrix}, u=\delta$$

$$y=Cx+Du, y=\begin{pmatrix}\gamma\\G_y\end{pmatrix} \quad (2)$$

-continued $$A=\begin{pmatrix}-\dfrac{Cp_f+Cp_r}{mV} & -\dfrac{Cp_fl_f-Cp_rl_r}{mV^2}-1\\-\dfrac{Cp_fl_f-C_rl_r}{I} & -\dfrac{Cp_fl_f^2+Cp_rl_r^2}{IV}\end{pmatrix}$$

$$B=\begin{pmatrix}\dfrac{Cp_f}{mV}\\\dfrac{Cp_fl_f}{I}\end{pmatrix}, C=\begin{pmatrix}0 & 1\\Va_{11} & V(a_{12}+1)\end{pmatrix}, D=\begin{pmatrix}0\\Vb_1\end{pmatrix}$$

In equation (2), m represents a vehicle mass, I represents a yaw moment of inertia, $l_f$ represents a distance between a center of gravity and a front axle, $l_r$ represents a distance between the center of gravity and a rear axle, $Cp_f$ represents a front wheel cornering power (a total value about left and right wheels), $Cp_r$ represents a rear wheel cornering power (a total value about left and right wheels), V represents a vehicle speed, β represents a vehicle sideslip angle β, γ represents a yaw rate, $G_y$ represents a lateral acceleration, and $a_{11}$, $a_{12}$ and $b_1$ represent elements of matrixes A and B.

On the basis of this equation of state, two-input linear observer 51 is created with an input of yaw rate and lateral acceleration, and an observer gain K1. Observer gain K1 is a value that is set to allow stable estimation which resists the influence of errors in modeling.

Two-input linear observer 51 includes a β estimation compensator 53 that corrects an input to integrator 52. With the β estimation compensator 53, two-input linear observer 51 ensures the accuracy of estimation also in a limit region. Specifically, the provision of the β estimation compensator 53 serves to accurately estimate vehicle sideslip angle β, not only under condition of road surface conditions that are assumed in designing the two-wheel vehicle model and a linear region in which the tire sideslip angle does not show nonlinear characteristics, but also under condition that the road surface μ changes or during limit running.

Figure 19:
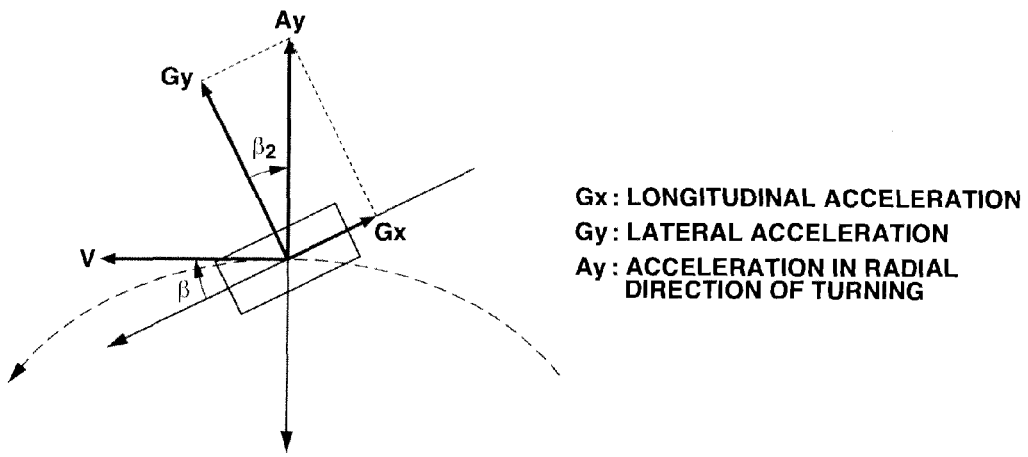
FIG. 19 is a diagram which is used to explain a field force acting on a vehicle body during cornering.

FIG. 19 shows a vehicle that is turning with a vehicle sideslip angle β. As shown in FIG. 19, a field force acting on a vehicle body, i.e. a centrifugal force acting outwardly from a center of turning, occurs with a deviation corresponding to vehicle sideslip angle β from a vehicle lateral direction. The β estimation compensator 53 calculates the deviation $\beta_2$ using the following equation (3). The deviation $\beta_2$ is a reference value (target value) G when the vehicle sideslip angle β estimated by two-input linear observer 51 is corrected.

$$\beta_2=\frac{1}{2}\pi-\text{Atan}\left(\frac{G_y}{G_x}\right) \quad (3)$$

Figure 20:
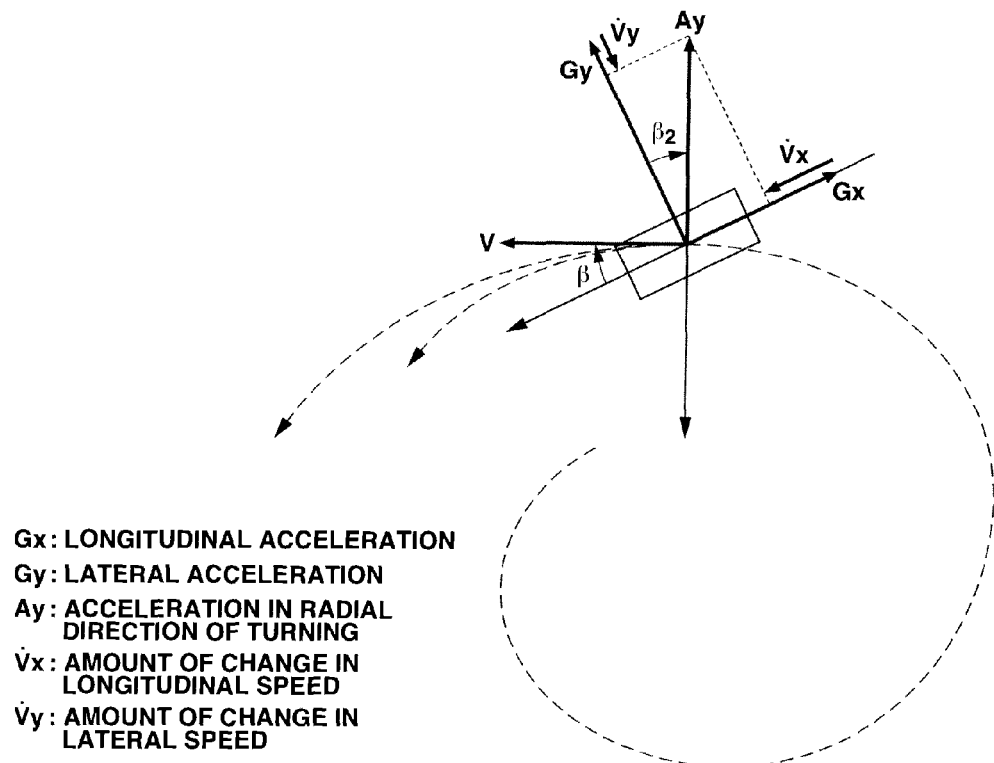
FIG. 20 is a diagram which is used to explain a field force acting on a vehicle body during cornering.

In equation (3), $G_x$ represents a longitudinal acceleration. As shown in FIG. 20, the balance in force due to speed change is taken into account. Only a part related to turning is abstracted so that the equation (3) is modified to the following equation (4).

$$\beta_2=\frac{1}{2}\pi-\text{Atan}\left(\frac{G_y-\dot{V}_y}{G_x-\dot{V}_x}\right) \quad (4)$$

The β estimation compensator 53 subtracts the target value $\beta_2$ from the vehicle sideslip angle β estimated by two-input linear observer 51. Moreover, the β estimation compensator 53 multiplies a result of the subtraction by a compensation gain K2 that is set using a control map of FIG. 21. The β estimation compensator 53 inputs a result of the multiplication to integrator 52.

Figure 21:
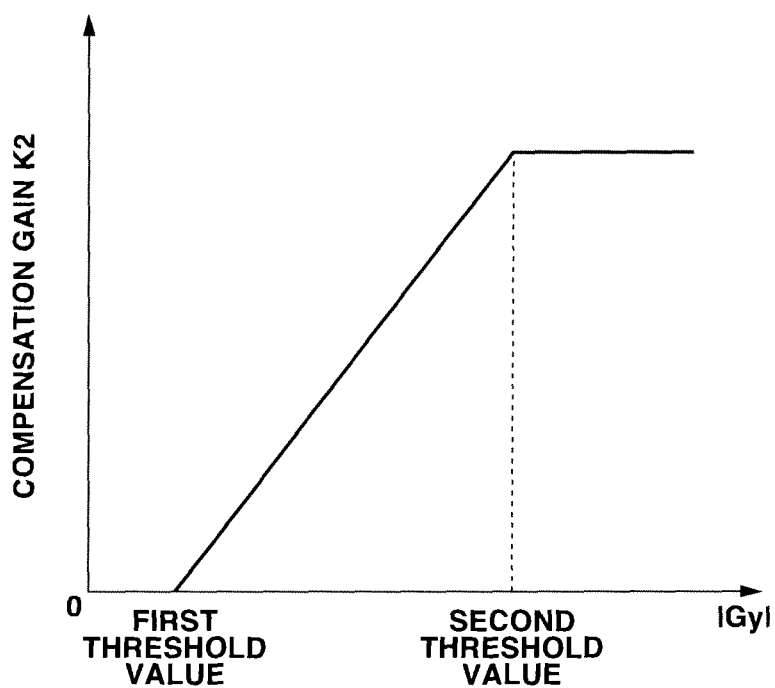
FIG. 21 is a characteristic diagram which is used to explain a control map for setting a compensation gain.

In the control map of FIG. 21, when the absolute value of lateral acceleration $G_y$ of the vehicle ($|G_y|$) is below a first threshold value, the compensation gain K2 is equal to zero. When the absolute value of lateral acceleration $G_y$ of the vehicle is above a second threshold value that is greater than the first threshold value, the compensation gain K2 is equal to a relatively large constant value. When the absolute value of lateral acceleration $G_y$ of the vehicle is between the first and second threshold values, the compensation gain K2 increases as the absolute value of lateral acceleration $G_y$ of the vehicle increases.

In this way, in the control map of FIG. 21, when the absolute value of lateral acceleration $G_y$ is below the first threshold value, and close to zero, the compensation gain K2 is set equal to zero. This serves to prevent the correction from incorrectly performed, when the correction is unnecessary under condition that no turning G occurs, for example, during traveling straight. When the absolute value of lateral acceleration $G_y$ has increased above the first threshold value (for example, above 0.1 G), the feedback gain (compensation gain) K2 is increased in proportion of the absolute value of lateral acceleration $G_y$. When the absolute value of lateral acceleration $G_y$ has increased above the second threshold value (for example, above 0.5 G), the compensation gain K2 is set at the constant value with which the control is stable. This serves to enhance the accuracy of estimation of vehicle sideslip angle β.

Tire slip angle calculating section 43 calculates front wheel and rear wheel slip angles $β_f$ and $β_r$ (wheel slip angle βt) on the basis of the steering angle (tire steer angle δ) detected by steering angle sensor 21, the yaw rate γ detected by yaw rate sensor 22, the vehicle speed V calculated by vehicle speed calculating section 41, and the vehicle sideslip angle (vehicle slip angle) β calculated by vehicle slip angle estimating section 42, using the following equation (5).

$$β_f = β + l_f γ/V - δ$$

$$β_r = β - l_r γ/V \quad (5)$$

Tire slip angle calculating section 43 outputs the calculated front wheel and rear wheel slip angles $β_f$ and $β_r$ to road surface μ estimated value calculating section 45.

Tire lateral force calculating section 44 calculates front wheel and rear wheel lateral forces $Fy_f$ and $Fy_r$ on the basis of the yaw rate γ detected by yaw rate sensor 22 and the lateral acceleration $G_y$ detected by lateral acceleration sensor 23, using the equation (6).

$$mGy = Fy_f + Fy_r$$

$$I\dot{γ} = Fy_f l_f - Fy_r l_r \quad (6)$$

Figure 22:
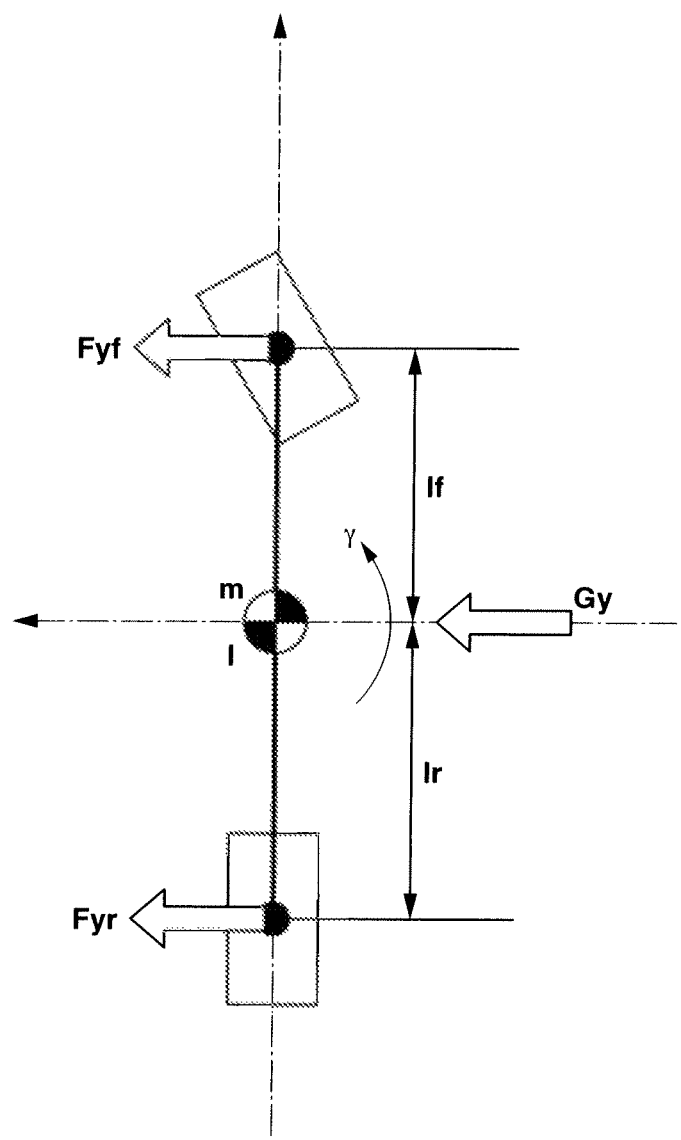
FIG. 22 is a diagram which is used to explain a linear two-wheel vehicle model.

The yaw rate γ and lateral acceleration $G_y$ are quantities as shown in FIG. 22. Tire lateral force calculating section 44 outputs the lateral forces $Fy_f$ and $Fy_r$ to road surface μ estimated value calculating section 45.

Road surface μ estimated value calculating section 45 calculates an estimated value of road surface μ in a manner similar to road surface μ calculating section 3 in the first embodiment. Namely, road surface μ estimated value calculating section 45 stores a characteristic map in a memory or the like, wherein the characteristic map is composed of a tire characteristic curve under condition of a reference road surface. The tire characteristic curve under condition of the reference road surface in the form of the characteristic map is shown in FIG. 9, for example. The characteristic map of the tire characteristic curve under condition of the reference road surface is prepared for front wheels and for rear wheels, respectively. Namely, a combined characteristic map for two front wheels and a combined characteristic map for two rear wheels are prepared. As described in the first embodiment, the characteristic map of the tire characteristic curve under condition of the reference road surface is obtained by a running test beforehand. For example, the running test is implemented by an acceleration circular turning running test. The tire characteristic curve under condition of the reference road surface is obtained based on a relationship between change in slip angle and change in lateral force which is obtained by the acceleration circular turning running test under condition of the reference road surface. Alternatively, the characteristic map of the tire characteristic curve under condition of the reference road surface may be obtained by calculation such as simulation instead of the running test.

Figure 23:
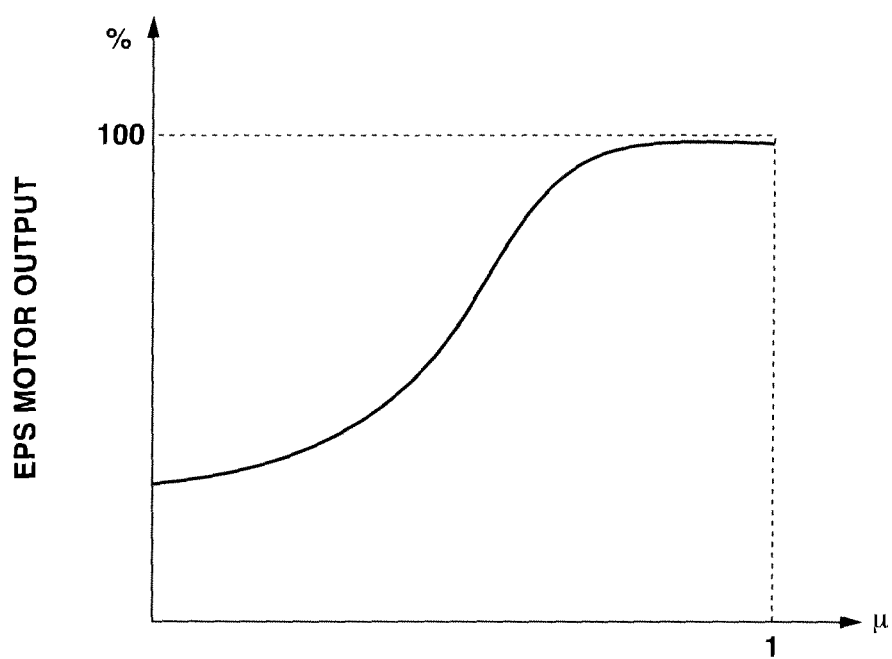
FIG. 23 is a diagram which is used to explain an EPS output adjustment map.

Road surface μ estimated value calculating section 45 estimates a relationship between lateral force and slip angle on the basis of the thus-obtained characteristic map of the tire characteristic curve under condition of the reference road surface. Namely, road surface μ estimated value calculating section 45 calculates an estimated value of the road surface μ (or maximum road surface μ) of an actual traveled road surface (refer to description about FIGS. 11 to 15). Road surface μ estimated value calculating section 45 outputs the calculated estimated value of road surface μ to EPSECU 26. EPSECU 26 outputs a steering assist command to EPS motor 27 on the basis of the estimated value of road surface μ. Specifically, the steering assist command is such that the output of EPS motor 27 decreases as the road surface μ decreases. For example, the steering assist command is set on the basis of an EPS output adjustment map. FIG. 23 shows an example of EPS output adjustment map. As shown in FIG. 23, the EPS output adjustment map is such that the output of EPS motor 27 decreases as the road surface μ decreases.

<Operation> Operation is as follows. While the vehicle is traveling, vehicle slip angle estimating section 42 estimates the sideslip angle (slip angle) of the vehicle on the basis of the steering angle detected by steering angle sensor 21, the yaw rate detected by yaw rate sensor 22, the lateral acceleration detected by lateral acceleration sensor 23, the longitudinal acceleration detected by longitudinal acceleration sensor 24, and the vehicle speed calculated by vehicle speed calculating section 41. On the other hand, tire lateral force calculating section 44 calculates the lateral force Fy on the basis of the yaw rate γ detected by yaw rate sensor 22 and the lateral acceleration $G_y$ detected by lateral acceleration sensor 23. Then, road surface μ estimated value calculating section 45 calculates an estimated value of road surface μ of an actual traveled road surface on the basis of the lateral force Fy and slip angle, and the characteristic map. EPSECU 26 controls EPS motor 27 by the steering assist command on the basis of the estimated value of road surface μ. Specifically, the control is performed so that the output of EPS motor 27 decreases as the road surface μ decreases.

The second embodiment may be implemented by the following configuration. In the second embodiment, vehicle running behavior control is described for the case where the steering assist torque of the vehicle is controlled on the basis of an estimated road surface μ. This may be modified so that another controlled variable for vehicle running control (for example, braking/driving torque) is controlled on the basis of an estimated road surface μ.

<Operation and Effect> The second embodiment operates and produces effects as follows.

<1> It detects the lateral force and slip angle of a wheel during traveling, and calculates a ratio between the detected wheel lateral force and wheel slip angle. Then, it estimates a relationship between the lateral force and the slip angle on a basis of the calculated ratio, a tire characteristic curve, and at least one of the detected lateral force and slip angle, wherein the tire characteristic curve is obtained as a correlation between the lateral force of the wheel and the slip angle of the wheel under condition of a reference road surface. Then, it implements vehicle running behavior control by controlling the steering assist torque on the basis of the actual road surface μ of the traveled road surface. This makes it possible to suitably control the steering assist torque of the vehicle according to the road surface μ of the traveled road surface.

Specifically, it detects the lateral force and slip angle of a wheel during traveling, and calculates a ratio between the detected wheel lateral force and wheel slip angle. Moreover, it determines the lateral force of the wheel or the slip angle of the wheel on a tire characteristic curve, wherein the ratio between the lateral force of the wheel and the slip angle of the wheel is identical to the calculated ratio, and wherein the tire characteristic curve is obtained as a relationship between the lateral force of the wheel and the slip angle of the wheel under condition of a reference road surface. Then, it calculates an actual road surface μ of a traveled road surface on the basis of the ratio between the determined lateral force of the wheel and the detected lateral force or the ratio between the determined slip angle and the detected slip angle, and the road surface μ of the reference road surface. Then, it implements vehicle running behavior control by controlling the steering assist torque on the basis of the actual road surface μ of the traveled road surface.

This makes it possible to calculate on the basis of the ratio between the lateral force and slip angle the actual road surface μ of the traveled road surface, if the lateral force and slip angle can be detected. Accordingly, it is possible to estimate the road surface μ of the traveled road surface before the occurrence of slippage. This makes it possible to suitably control the steering assist torque of the vehicle according to the road surface μ of the traveled road surface. As a result, it is possible to prevent the occurrence of a loss in braking/driving force due to slippage, and prevent spinning and drifting-out, while the vehicle is turning.

The steering assist torque is set so that the steering assist torque decreases as the road surface μ decreases. This makes it possible to prevent accidental quick steering, and prevent drifting-out due to quick steering while traveling on a low μ road such as a snowy road or frozen road.

The invention claimed is:

1. A road surface friction coefficient estimating device comprising:
    a lateral force detecting section that detects a lateral force of a wheel;
    a slip angle detecting section that detects a slip angle of the wheel; and
    a road surface friction coefficient estimating section that:
        stores information about a characteristic curve in a coordinate plane, wherein the coordinate plane has a coordinate axis representing the lateral force and a coordinate axis representing the slip angle, and wherein the characteristic curve represents a relationship between the lateral force and the slip angle under a condition of a reference road surface friction coefficient;
        finds with reference to the stored information a point in the coordinate plane at which a straight line intersects with the characteristic curve, wherein the straight line passes through an origin point of the coordinate plane and a detected point, and wherein the detected point corresponds to a detected value of the lateral force obtained by the lateral force detecting section and a detected value of the slip angle obtained by the slip angle detecting section; and
        calculates an estimated value of a road surface friction coefficient, based on a reference value and the detected value of at least one of the lateral force and the slip angle and the reference road surface friction coefficient, wherein the reference value corresponds to the found point.

2. The road surface friction coefficient estimating device as claimed in claim 1, wherein the road surface friction coefficient estimating section:
    calculates a gradient of the straight line in the coordinate plane by dividing the detected value of the lateral force by the detected value of the slip angle; and
    finds the found point based on the gradient.

3. The road surface friction coefficient estimating device as claimed in claim 1, wherein the coordinate plane has a horizontal axis representing the slip angle and a vertical axis representing the lateral force.

4. The road surface friction coefficient estimating device as claimed in claim 1, wherein the origin point of the coordinate plane is a point at which the lateral force is equal to zero.

5. The road surface friction coefficient estimating device as claimed in claim 1, wherein the road surface friction coefficient estimating section:
    calculates a ratio to reference based on the reference value and the detected value of at least one of the lateral force and the slip angle; and
    calculates the estimated value of the road surface friction coefficient based on the ratio to reference and the reference road surface friction coefficient.

6. The road surface friction coefficient estimating device as claimed in claim 5, wherein the road surface friction coefficient estimating section calculates the ratio to reference by dividing the detected value of the at least one of the lateral force and the slip angle by the reference value of the at least one of the lateral force and the slip angle.

7. The road surface friction coefficient estimating device as claimed in claim 5, wherein the road surface friction coefficient estimating section:
    calculates as a first distance a distance in the coordinate plane between the detected point and a point at which the lateral force is equal to zero;
    calculates as a second distance a distance in the coordinate plane between the found point and a point at which the lateral force is equal to zero; and
    calculates the ratio to reference based on the first and second distances.

8. The road surface friction coefficient estimating device as claimed in claim 7, wherein the road surface friction coefficient estimating section calculates the ratio to reference by dividing the first distance by the second distance.

9. The road surface friction coefficient estimating device as claimed in claim 1, wherein the road surface friction coefficient estimating section stores information about a second characteristic curve in a second coordinate plane,
    wherein the second coordinate plane has a horizontal axis representing a ratio of the lateral force to the slip angle and a vertical axis representing the lateral force, and wherein the second characteristic curve represents a relationship between the lateral force and the slip angle under a condition of the reference road surface friction coefficient.

10. The road surface friction coefficient estimating device as claimed in claim 9, wherein the road surface friction coefficient estimating section:
    calculates as a ratio to reference a ratio of the detected value of the lateral force to the reference value of the lateral force with reference to the information about the second characteristic curve; and
    calculates the estimated value of road surface friction coefficient based on the ratio to reference and the reference road surface friction coefficient.

11. The road surface friction coefficient estimating device as claimed in claim 10, wherein the road surface friction coefficient estimating section calculates the ratio to reference by dividing the detected value of the lateral force by the reference value of the lateral force.

12. The road surface friction coefficient estimating device as claimed in claim 1, wherein the road surface friction coefficient estimating section stores information about a second characteristic curve in a second coordinate plane,
    wherein the second coordinate plane has a horizontal axis representing a ratio of the lateral force to the slip angle and a vertical axis representing the slip angle, and
    wherein the second characteristic curve represents a relationship between the lateral force and the slip angle under a condition of the reference road surface friction coefficient.

13. The road surface friction coefficient estimating device as claimed in claim 12, wherein the road surface friction coefficient estimating section:
    calculates as a ratio to reference a ratio of the detected value of the slip angle to the reference value of the slip angle with reference to information about the second characteristic curve; and
    calculates the estimated value of road surface friction coefficient based on the ratio to reference and the reference road surface friction coefficient.

14. The road surface friction coefficient estimating device as claimed in claim 13, wherein the road surface friction coefficient estimating section calculates the ratio to reference by dividing the detected value of the slip angle by the reference value of the slip angle.

15. The road surface friction coefficient estimating device as claimed in claim 13, wherein the road surface friction coefficient estimating section calculates the estimated value of the road surface friction coefficient by multiplying the reference road surface friction coefficient by the ratio to reference.

16. A road surface friction coefficient estimating method comprising performing:
    an operation of detecting, by a controller, a lateral force of a wheel;
    an operation of detecting, by the controller, a slip angle of the wheel; and
    an operation of:
        storing, by the controller, information about a characteristic curve in a coordinate plane, wherein the coordinate plane has a coordinate axis representing the lateral force and a coordinate axis representing the slip angle, and wherein the characteristic curve represents a relationship between the lateral force and the slip angle under a condition of a reference road surface friction coefficient;
        finding, by the controller, with reference to the stored information, a point in the coordinate plane at which a straight line intersects with the characteristic curve, wherein the straight line passes through an origin point of the coordinate plane and a detected point, and wherein the detected point corresponds to a detected value of the lateral force obtained by the lateral force detecting and a detected value of the slip angle obtained by the slip angle detecting; and
        calculating, by the controller, an estimated value of road surface friction coefficient, based on a reference value and the detected value of at least one of the lateral force and the slip angle, and the reference road surface friction coefficient, wherein the reference value corresponds to the found point.

* * * * *